March 24, 1942. J. SNEED 2,277,157
TRANSMISSION
Filed Dec. 31, 1935 10 Sheets-Sheet 1
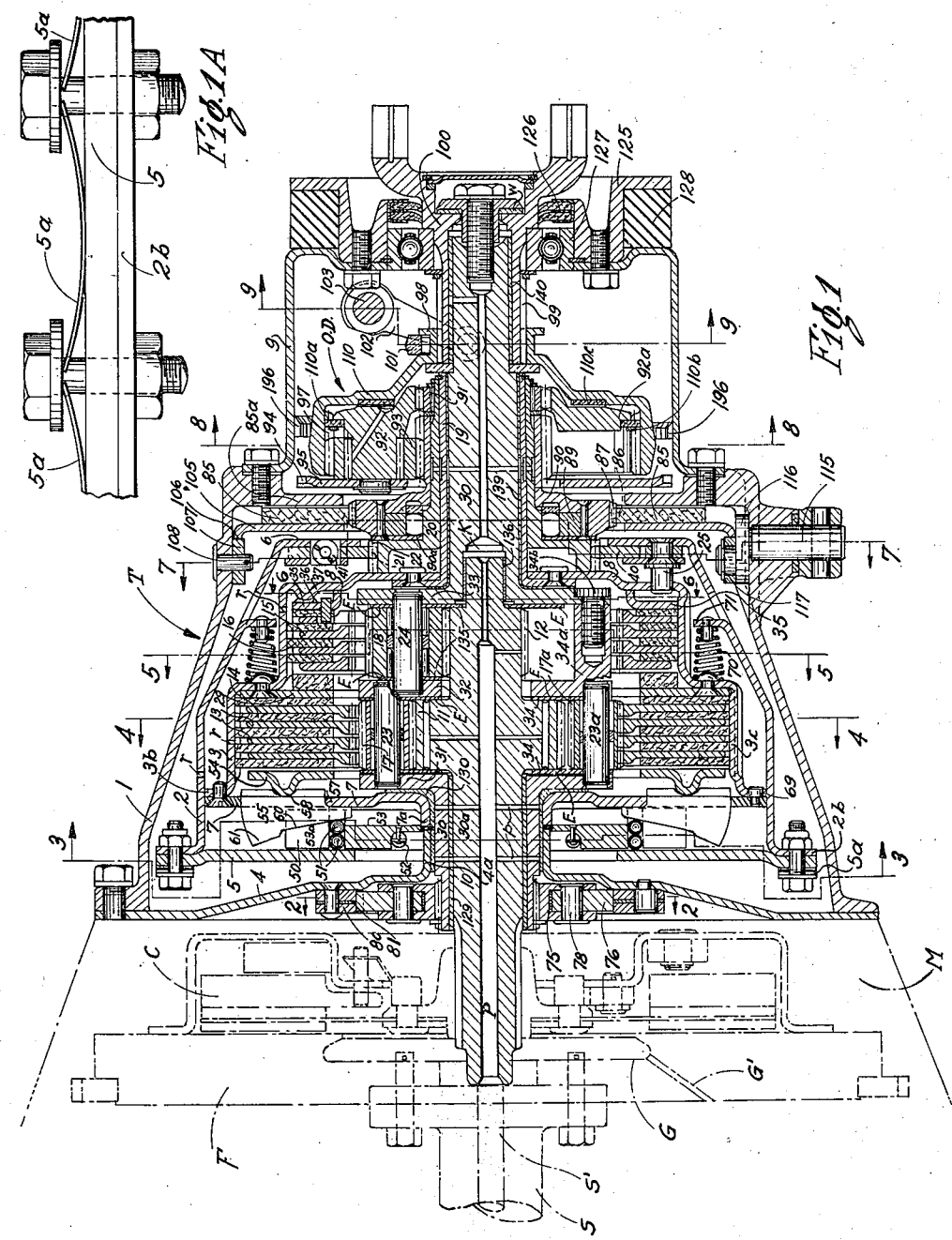
Inventor
JOHN SNEED
By
Attorneys March 24, 1942.         J. SNEED         2,277,157
TRANSMISSION
Filed Dec. 31, 1935         10 Sheets-Sheet 2
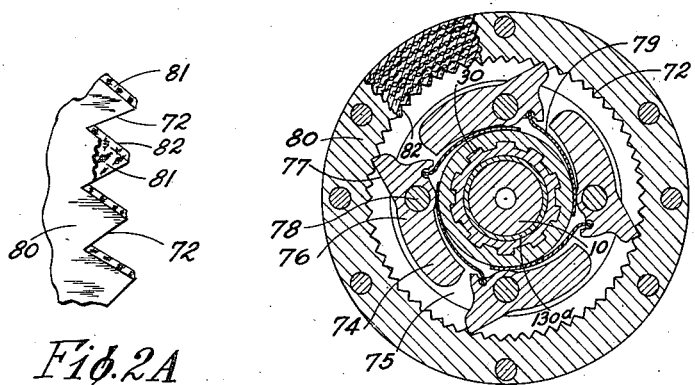
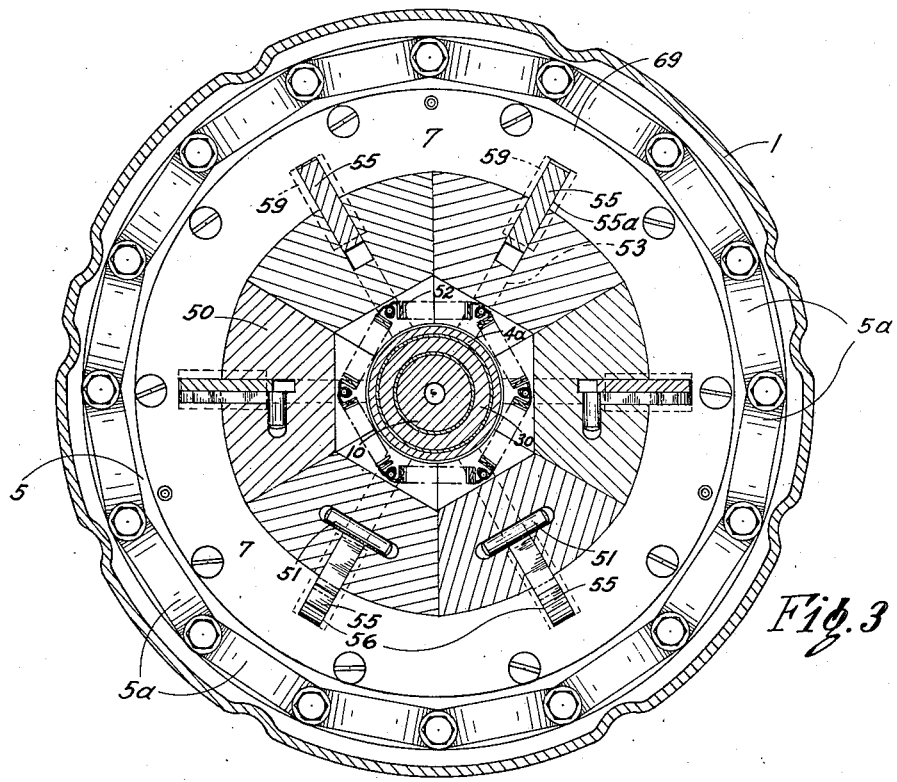
Inventor
JOHN SNEED
By Ridley & Watts
Attorneys March 24, 1942.  J. SNEED  2,277,157
TRANSMISSION
Filed Dec. 31, 1935  10 Sheets-Sheet 3

Inventor
JOHN SNEED
By
Richey & Watts
Attorneys

March 24, 1942.    J. SNEED    2,277,157
TRANSMISSION
Filed Dec. 31, 1935    10 Sheets-Sheet 4

Inventor
JOHN SNEED
By Richey & Watts
Attorneys

Inventor
JOHN SNEED

March 24, 1942.  J. SNEED  2,277,157

TRANSMISSION

Filed Dec. 31, 1935  10 Sheets-Sheet 7

Inventor
JOHN SNEED
BY
Attorneys

Inventor
JOHN SNEED
BY
Riley & Watt
Attorneys

March 24, 1942. J. SNEED 2,277,157
TRANSMISSION
Filed Dec. 31, 1935 10 Sheets-Sheet 9

Inventor
JOHN SNEED
By
Attorneys

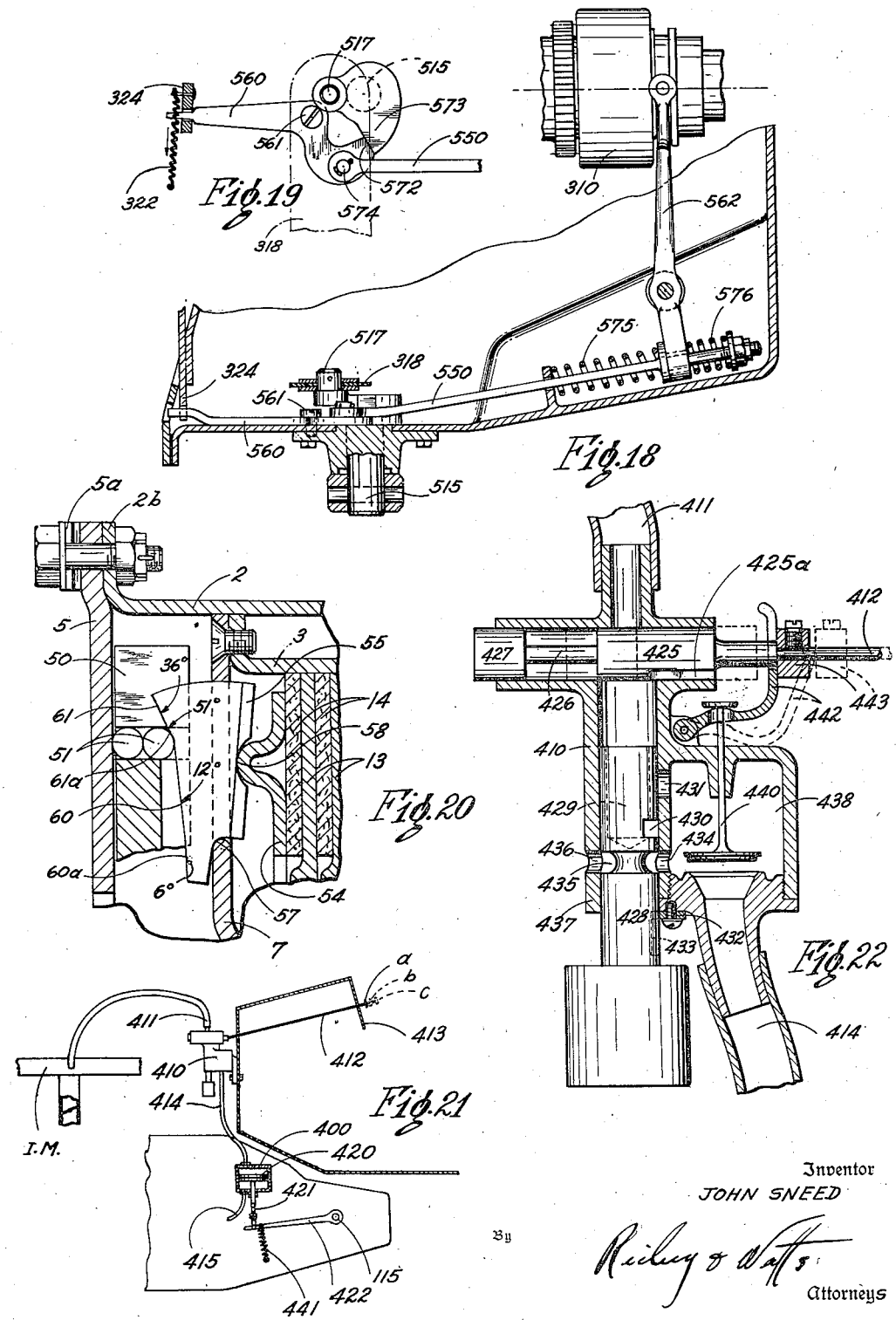

Patented Mar. 24, 1942

2,277,157

UNITED STATES PATENT OFFICE 2,277,157

TRANSMISSION

John Sneed, Grosse Pointe Shores, Mich.

Application December 31, 1935, Serial No. 57,017

20 Claims. (Cl. 74—259)

This invention relates to transmission mechanism and more particularly to transmission mechanism of the automatic type which brings about and retains such speed ratios between the driving and driven members as are most appropriate to meet the demands imposed upon the instrumentalities with which it is operated under the varying conditions of such operation.

For the purpose of illustrating and describing my invention I will refer to it in the environment of an automobile of the type in common use today, but I expect those skilled in the art to appreciate that the application of the principles of my transmission or the transmission itself may well be suited to many other and varied uses.

Certain novel features herein contained may be regarded as constituting improvements upon the subject matter disclosed in my copending application Serial No. 749,795 filed October 24, 1934. Part of the subject matter herein contained is common to that of my prior application, and to that extent this application is a continuation of my said prior application.

Certain of the broader objects of my invention are similar to those set forth in my prior application and may be briefly summarized as follows:

It is among the broader objects of my invention to provide an automatic transmission which will select and establish gear ratios between the driving and driven shafts most appropriate to the speed and load conditions existing between said shafts; to provide an automatic transmission particularly adapted for an automobile which will automatically correlate the engine speed to the vehicle speed in a manner conducive to optimum performance for all conditions of speed and load; to provide an automobile transmission capable of reflecting in its change and maintenance of gear ratios the conditions most effective to carry out the demands of the driver of the vehicle, and which is subject to the driver's control through its response to such demands; and to provide a transmission capable of carrying out these and other objects which is compact, economical of manufacture, relatively saving of weight and space, and efficient and fool-proof in operation.

Other objects having more particularly to do with improvements upon and inventive advances beyond the subject matter of my prior application include the provision of a novel method of over-drive control conducive to better economy and smoother vehicle operation under all conditions where maximum performance is not desired, but which provides maximum performance in any gear ratio should the same at any time be demanded. Other objects are to provide a novel over-drive mechanism and control therefor; to provide a reverse drive by virtue of which all the advantages of the automatic speed changes of the transmission are available in reverse as well as in forward speeds; and to provide a system of gearing and control capable of furnishing an over-drive under one condition and a reverse drive or "neutral" under other selectable conditions. Other objects are to provide an improved overrunning clutch and to provide an advantageous release and control therefor; to provide a system of gearing in which bearing and tooth loads are materially reduced and in which a more perfect balance of the moving parts is obtained; to provide improved mechanism for selecting, engaging, disengaging and maintaining the various gear reductions or relationships; and to provide an improved system of lubrication.

Other objects having more especially to do with the improvements upon the subject matter of my copending application are to provide a transmission capable of giving satisfactory performance and results with widely different kinds of friction materials having different coefficients of friction either in the first instance or as the material may wear or change its characteristics during the life of its operation; to provide a transmission which will give uniform satisfactory performance throughout a long range of wear and change of dimension, particularly of the friction material which may become worn in its operation; to provide an equal distribution of the tooth loads throughout the gears of the planetary trains in the transmission and smooth and noiseless operation thereof; to provide for the distribution of and reduction in bearing loads and obtain compactness and lightness of mechanism as well as more economical bearing construction and longer wear of the bearing parts; to insure smooth, yet positive and precise changes in gear ratios, and to eliminate the tendency of one or another of the established ratios to "hang on" after another ratio is intended to be established; to maintain substantially constant reactions from the torque and speed responsive members in their effect upon the selection, maintenance and release of the selectable gear ratios throughout the long life of the wearing parts in spite of the wear of such parts; to provide a "no back" brake and means for releasing and controlling the same; to provide particularly against damage or injury to the gear teeth as between the gears that I prefer to be manually shifted, as for example in changing from forward to reverse drive; and to provide interlocking or interconnecting controls, particularly in connection with the means for effecting a reverse drive to insure a smooth correlation between the transactions necessary or desirable to effect a satisfactory shift from forward to reverse drive and vice versa.

Other objects of my invention are to provide a transmission in which the relative speeds of the driving and driven members accurately reflect the speed and load conditions of the vehicle and its prime mover, and in which the forces of load and speed are so balanced and brought into effect to control the selection and maintenance of speed relationships between the driving and driven members that substantially ideal speed relationship between the vehicle and its prime mover are established and maintained throughout the range of their operation. Other objects of my invention include the provision of a transmission in which changes of speed relationships between the driving and driven members is effected smoothly and positively and without substantial loss of torque or driving impulse from the driving to the driven member, and in which the forces which act to create or maintain one or another speed relationship between the driving and driven members are commensurate with the load being transmitted.

Other objects and advantages will appear from the following description of preferred forms of embodiments of my invention, reference being had to the accompanying drawings. The essential characteristics are summarized in the claims.

In the drawings Figure 1 is a longitudinal section of my transmission as assembled for use in an automotive vehicle and includes a part of a universal joint at the rear end and in dotted lines indicates the crank-shaft of the prime mover and a clutch mechanism at the forward end; Figure 1A is an enlarged view of a portion of the torque drum and cover employed in the transmission.

Figure 2 is a transverse section taken along the line 2—2 of Figure 1 and illustrates an overrunning clutch mechanism;

Figure 2A is an enlarged view of the teeth of the clutch of Figure 2;

Figure 3 is a transverse section taken along the line 3—3 of Figure 1 and illustrates the mounting of a governor weight assembly;

Figure 18 is a transverse sectional view of a modified form of reverse control for the transmission shown in Figure 11;

Figure 19 is an elevation of the control shown in Figure 18;

Figure 20 is a diagrammatic showing of the cam and governor weight rollers employed in the preferred form of my transmission;

Figure 21 is a transverse sectional view of the vacuum actuated over-drive control mechanism;

Figure 22 is a transverse sectional view of the valve employed in the mechanism of Figure 21;

Figure 4:
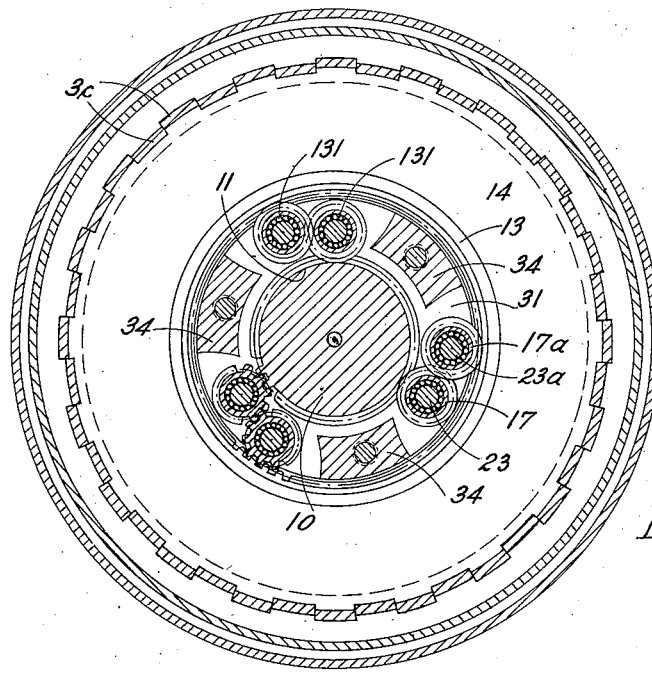
Figure 4 is a transverse section taken along the line 4—4 of Figure 1 and illustrates a second speed planetary gear assembly.

Referring to the drawings the transmission generally identified at T is contained within a bell housing 1 suitably flanged at its forward end and secured to a motor unit generally identified at M. The crankshaft S of the motor unit is secured to the forward face of the flywheel F which carries an automatic clutch C preferably constructed according to my co-pending application, Serial No. 18,811, filed April 29, 1935.

The forward end of the transmission bell housing 1 is substantially closed by a cover plate 4 which terminates centrally in an axially extending annular flange 4a and the rear portion of the bell housing 1 is provided with a supplementary housing 9 which encloses the over-drive and reverse mechanism OD. The rear wall of the over-drive housing is provided with an inwardly extending flanged end which supports an antifriction bearing assembly 127 and the transmission mechanism as a unit is substantially supported by the flanged portion 4a of the front cover plate and the antifriction bearing 127 at the rear end of the over-drive housing. At the forward end of the mechanism is a driving shaft 10 splined to the hub portion of the clutch mechanism C. At the rearward end of the transmission the driven member 100, which may incidentally form a part of a universal joint, not wholly shown, is rotatably mounted in the antifriction bearing 127 and is splined to a driven ring gear 110 of the over-drive mechanism. Between the driving shaft 10 and the driven shaft 100 are interposed the change speed, over-drive and reverse mechanisms.

Turning now more particularly to the change speed mechanism, the driven shaft 100 above referred to is hollow at its forward end and supports within its hollow end, through sleeve bearing 140, the rearward end or tail shaft of the gear carrier 30. The gear carrier 30 extends forwardly from its mounting in the shaft 100 and is shaped and proportioned to embrace or surround the driving shaft 10 and functions generally to support planetary gears which intermesh with sun gears on the driving shaft and surrounding clutch gears selectably engageable with the driven shaft, see also Figs. 4 and 5.

More specifically the gear carrier extends forwardly from the bearing 140 through a sleeve bearing 139 and is provided with a flanged part or radially extending plate 33 which may be referred to as the back plate of the gear carrier inasmuch as similar plates spaced therefrom comprise complementary parts of the gear carrier structure. A central plate 32 of the gear carrier unit has formed thereon three circumferentially spaced rearwardly extending spacing blocks 34a, see Fig. 5. The spacing blocks 34a are internally threaded to receive cap screws 34b extending through apertures in the rear plate 33 of the gear carrier. Forwardly extending spacing blocks 34 (see Fig. 4) are provided on the forward face of the central gear carrier plate 32 and are engaged by similar cap screws arranged in the forward gear carrier plate 31. The forward end of the gear carrier unit 30 comprises the plate 31 having a forwardly extending sleeve surrounding and rotatably mounted upon the driving shaft 10 through the sleeve bearing 129. Thus the three carrier plates 31, 32 and 33 as connected through the spacing blocks 34 and 34a form a unitary structure rotatably mounted with respect to the driving shaft 10 and the driven shaft 100.

Between the forward plate 31 and the central plate 32 of the gear carrier is mounted a series of planetary gears 17 and 17a, see Fig. 4. These planetary gears, which may be referred to as the second speed gears, are mounted in pairs substantially 120° apart and are arranged so that the inner gears 17 are in mesh with the sun gear 11 integrally formed with the driving shaft, and the outer gears 17a are mounted a greater distance from the center of the driving shaft and mesh with gears 17 and also mesh with the toothed parts 13 of a second speed-clutch ring gear. The arrangement of gears 17 and 17a to transmit rotation from the sun gear 11 to the surrounding clutch-gear is such that the same directional rotation will be maintained and the bearing pin pressure of the gears 17 and 17a will be reduced so that needle or quill bearings 131 may be employed to support the planet gears. Bearing pins 23 and 23a employed to support the planet gears 17 and 17a respectively on the gear carrier are mounted in suitable recesses provided in the opposing faces of gear carrier plates 31 and 32.

Figure 5:
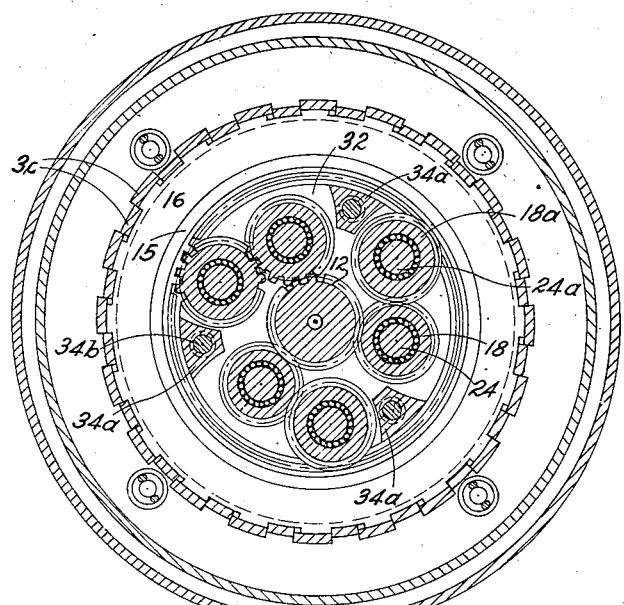
Figure 5 is a transverse section taken along the line 5—5 of Figure 1 and illustrates the low speed planetary gear assembly.

A planetary gear assembly similar to the second speed gear assembly above described is employed in connection with the low speed drive. As illustrated in Figure 5 the inner planet gears 18 of the planet gear couple 18—18a are in mesh with sun gear 12 integrally formed with the driving shaft 10 and are also in mesh with planets 18a which transmit the rotation to the toothed parts 15 of the low speed clutch ring gear. The planetary gears of the low speed assembly are arranged in pairs as shown and advantageously permit the use of needle bearings 132 in the manner heretofore described because of the distribution of loads thereupon. The low speed planetary gears are mounted upon bearing pins 24 and 24a arranged in recesses in the opposing faces of the gear carrier plates 32 and 33. Since the low speed driving sun gear 12 and the second speed driving sun gear 11 are preferably integral with the driving shaft 10, the sun gears and shaft form a composite gear unit rotatably mounted within the gear carrier 30 and in mesh with the inner planet gears 17 and 18 mounted on said gear carrier. Suitable end thrust bearings E, see Fig. 1, preferably comprising bronze disks or washers, are interposed between the ends of each of the planets and the adjacent faces of the carrier plates 31, 32 and 33 adjacent the supporting pins 23, 23a, 24 and 24a.

It will be observed particularly in Figures 4 and 5 that the disposition of the planets in three symmetrically arranged pairs in the low and second speed gear trains respectively provides an even distribution of weight and provides a symmetrical distribution of torque loads and tooth pressures in each system. The distribution of forces resulting from tooth pressures is such that there is no tendency to displace either the sun gears or the ring gears laterally relative to each other, whereby the bearing loads due to driving pressures in both the sun and the ring gears are substantially negligible. Since the bearing loads imposed on the planet bearings are all absorbed within the gear carrier system including the plates 31, 32, 33, no external forces result to tend to displace the carrier relative to the main bearings at the rear and forward ends of the transmission.

I prefer that the several disks 13 and 15 which compositely comprise the ring gears for each of the planetary trains be mounted without external radial support since there is no resulting tendency for radial displacement thereof arising by virtue of any driving load and since such a mounting insures that each disk will properly center itself with respect to the three planets with which it meshes. It will be appreciated that when driving load is transmitted or is begun to be transmitted from the planets to the tooth ring gear disks 13 and/or 15, the tooth reactions at the three points of contact will tend equally to force the disks radially outwardly at each of the three points (the three points being preferably respectively 120° apart), and thereby not only tends to center each of the disks with respect to the three planets with which it is engaged, but also tend to shift, if need be, and center the disks so that each of the planets delivers an equal portion of the driving load into each of the disks. Thus as the ring gear clutches are being engaged, this centering and load distributing function takes place so that when engagement is complete the tooth disks have been forced not only into an ideal position of geometric symmetry with respect to the planets, but also into a position to take equal loads from each of the three planets. This arrangement insures not only quiet operation of the gears, but also long life and the absence of excessive tooth pressures at one point with respect to any of the others.

In the conventional planetary system wherein the drive from the sun gear is through a single set of planetary gears to a ring gear, it will be observed that the bearing pin pressure of each of the planets is substantially twice the tooth pressure on the planet. In a planetary system constructed according to my invention the drive from the sun gear through the inner series of planets in mesh therewith is not across the diameter (180°) of the planet as in the conventional system, but is through an angle of about 90°. The drive from the inner series of planets to the outer series and to the ring gear is likewise through an angle of about 90°. This arrangement effects a reduction in planet pin bearing pressure that is a function of the angle of the drive through the planets and thus my construction is well suited to the use of needle bearings or other anti-friction bearings that would not be suited to the conventional single series planet system.

It will be appreciated from examination, particularly of Figure 1, that my transmission adapts itself to the use of helical gears in the planetary system. The end thrust resulting in the inner series of planets by the drive from the sun gear is transmitted to the gear carrier. This end thrust, however, is opposed by an end thrust in the opposite direction from the outer series of planetary gears so that there is no resultant end thrust on the gear carrier as a whole. The end thrust in the clutch gears, which is in a direction opposite to the end thrust on the sun gears, is transmitted to the inner drum 3 which is provided with thrust bearings 130 and 139 at the ends thereof, where it engages the gear carrier. The gear carrier itself is fitted with end thrust bearings 34 and 135 on radial faces of the driving shaft, and thus the end thrusts effected by the drive through the transmission are opposed.

From the foregoing description those skilled in the art will understand that when, by means yet to be described, the drive is effected through the driving shaft 10, the gear 12 thereon, the planetary gears 18 and 18a, a reduction in speed will be effected between the driving shaft 10 and the low speed clutch gear engaging the planetary gears 18a. When, however, the drive is from driving shaft 10 through the gear 11, planatery gears 17—17a and the clutch gear in engagement therewith, a lesser reduction is effected between the driving shaft and the driven clutch gear. It will further be understood by those skilled in the art at this point in the description of the invention that, when by means presently to be described, no relative rotation is permitted between the driving shaft 10 and either the low speed or second speed planetary gear systems that a direct drive may be established between the driving shaft 10 and the driven parts of the transmission.

To restrain the gear carrier 30 from negative rotation and maintain the low speed and second speed planetary gears in position to transmit rotation from the sun gears to the clutch gears when rotation of the driven shaft is desired, I provide an overrunning clutch at the forward end of the gear carrier, which preferably comprises the following novel arrangement. An annular ring 75 U-shaped in cross section, see Fig. 1, is secured to the forward extremity of the gear carrier and pivotally supports on pins 78 a series of spaced eccentrically weighted pawls 76, see also Fig. 2. An annular two-part ring 80, secured to the forward cover plate 4 of the transmission housing, is notched as at 82 to receive the noses of the pawls 76 carried by the ring 75. Springs 79 urge the noses of the pawls into the notches 72 of the fixed ring 80. When the ring 75 is rotated in a counterclockwise direction as viewed in Figure 2, the pawls overrun the notches in the ring 80 by reason of the inclined engagement between the back faces 77 of the pawls with the complementary facing of the notches. Whenever the carrier speed rotates the ring 75 rapidly enough the weighted portion 74 of the pawls swing outwardly against the springs 79 and draw the noses of the pawls away from the notches in the ring 80. Conversely as the carrier slows down the noses of the pawls are urged radially outward into the notches and at or about zero relative speed between the rings 75 and 80 so engage the notches as to prevent relative clockwise rotation of the carrier with respect to the ring as viewed in Figure 2. It thus follows that there may be short periods when the carrier ring 75 is overrunning the fixed ring at relatively low speeds when the pawls will intermittently engage the notches and cause an upleasant sound. To deaden the sound I prefer that the ring 80 be formed in two disk-like halves between which is preferably secured a ring of sound deadening material 81 such as fabric impregnated with phenol resin compounds. The fabric ring 81 is notched as shown in Figure 2A so that it has overhanging portions 82 which project into the notches on one side thereof to engage the backsides 77 of the noses of the pawls, and cushion the contact of those surfaces during the limited periods of time above mentioned.

The foregoing description has been premised on the assumption that means are provided for selectively transmitting the torque from the low speed and second speed clutch ring gear disks 13 and 15 respectively when they are actuated from the driving shaft 10 and sun gears 12—11 integral therewith. The following description is directed more particularly to the means by which the torque and drive are selectively taken from these gears to effect low, second speed and direct drive relationships between the driving shaft 10 and the driven shaft 100.

Rotatably mounted concentrically of the axes of the driving and driven shafts and rotatably supported with respect to the main casing 1 are two cup-shaped parts or drums 2 and 3 which encompass the gear carrier 30 and its associated parts. Both of the drums are preferably adapted to be formed by deep drawing operations and can be economically manufactured for that reason. Both drums are mounted with respect to each other to rotate substantially in unison and to have a longitudinal sliding fit with respect to each other so that there may be axial movement between them.

Figure 7:
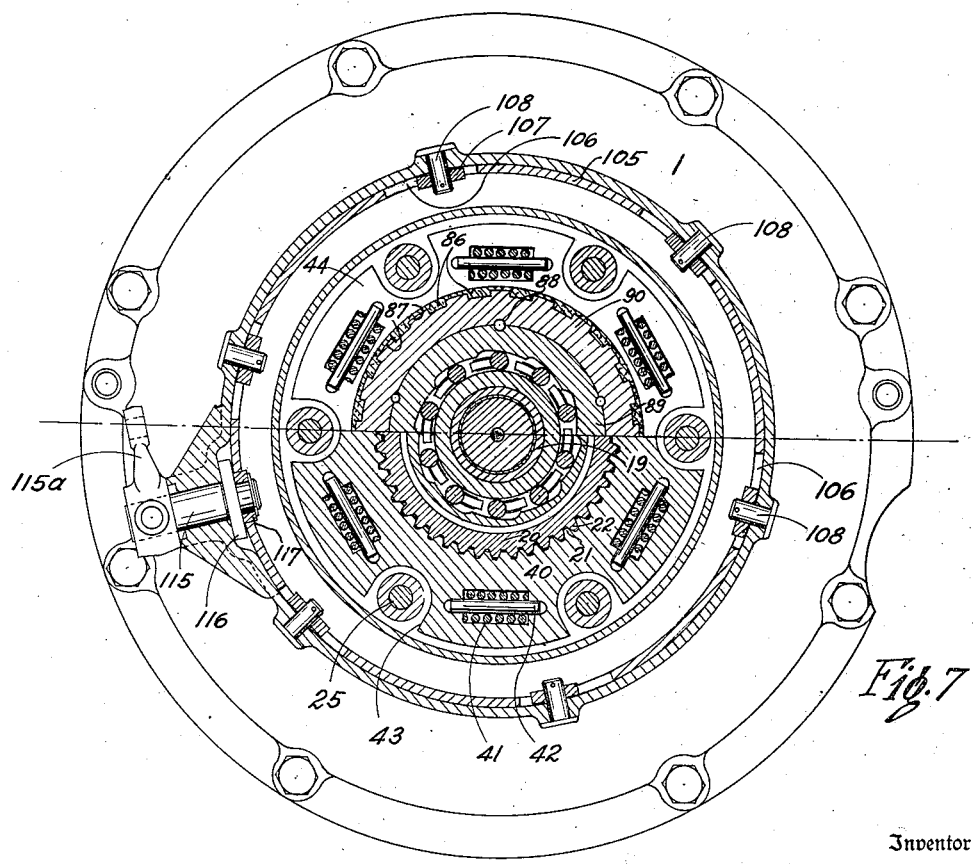
Figure 7 is a transverse section looking forwardly of the transmission on line 7—7 of Figure 1 and illustrates a driving connection between the torque and load responsive parts of the transmission and an over-drive mechanism.

The outer drum 2, which may be hereafter referred to as the torque drum, is enlarged at its forward end and is enclosed adjacent its periphery by a centrally apertured cover plate 5 which is mounted thereon for limited axial movement with respect thereto and which extends inwardly but terminates short of the flange or collar 4a of the cover 4 of the main housing and is free at all times of said collar. As illustrated in Figure 1A the bolts employed to secure the cover 5 to the flange 2b of the drum 2 are provided with washers on the cover plate side and a series of leaf springs 5a are arranged with their free notched ends beneath the said washers. The convex portion of spring leaf bears against the cover plate 5 and the springs thus urge the cover plate into engagement with the flange 2b to compensate for certain clutch and governor weight reactions to be more fully described hereinafter. The rearward end of the torque drum 2 extends inwardly as at 6 and carries thereon, preferably through a spring mounting, a splined torque disk 40, see Fig. 7. The splines 21 of the member 40 are inclined with respect to the longitudinal axis of the transmission and slidably engage the teeth 22 of a helical torque gear member 20. The hub portion of the torque gear extends rearwardly and transmits the torque to the overdrive and reverse mechanism identified generally at OD and thence to the driven shaft 100.

The mounting of the torque disk 40 is effected by positioning the disk 40 between the inner radial wall 6 of the drum 2 and a spaced disk 44 parallel to and rigidly secured to said wall. The torque disk 40 is notched at its outer periphery as at 43 to encompass the pins 25 which secure the disk 44 to the drum 6 and is provided with spaced rectangular apertures intermediate the notches 43 to receive springs 41. Spring pins 42 extend axially of the springs 41 and are supported at each end of said apertures in the disk 40. As will be observed from Figure 1 the springs 41 are proportioned to extend laterally on each side of the rectangular apertures in the disk 40 and said extended segments abut against similarly formed rectangular apertures in the wall 6 of the torque drum 2 and in the retaining disk 44 carried thereby. The effect of the above described mounting is to cushion torque reactions transmitted from the drum 2 to the torque gear 20 and likewise from the torque gear 20 back to the torque drum 2.

The inner drum 3, see Fig. 1, is provided at its forward end with a fixed cover plate 7 having a forwardly extending annular bearing portion 7a which bears on its inner surface against a sleeve bearing 130 arranged about the outer end of the forward part of the gear carrier 30. The combined thickness of the cover 7 and flange 3b is preferably less than the total longitudinal travel of the outer drum with respect to the inner drum so as to effect an oil scraping action on the bearing surfaces therebetween and prevent the formation of any sticky deposits which might adversely affect the smooth sliding fit. The bearing 130 is flanged as best shown in Figure 1 and will take end thrust imposed thereon from the central portion of the cover plate 7. The rear wall of the inner drum 3 is centrally apertured and supports in said aperture a rearwardly extending forwardly flanged sleeve member 19. The member 19 is preferably riveted within the apertured rear wall and encompasses through sleeve bearing 139 the rearwardly extending portion or tail shaft of the gear carrier 30. The outer surface of the sleeve member 19 serves to support the torque gear member 20 and permits the necessary limited rotation of said member with respect thereto.

The rear radial wall 6 of the torque drum 2 supports a series of spaced pins 25 which in addition to mounting the torque disk 40 and securing the plate 44 also extend axially forward and project through a complementary series of apertures provided in the rear radial wall 8 of the inner drum 3. The forward portions of the pins 25 have a close sliding fit in the apertures of the inner drum by virtue of which they are free to move axially of the inner drum 3 but permit no circumferential movement between the drums 2 and 3. In the operation of the device such torque as is imposed upon the inner drum 3 is transmitted through the pins 25 to the outer drum 2, thence through the helical spline 21—22 to the torque gear 20 and thence to the driven shaft 100.

At the forward end of the inner drum 3 and preferably at the periphery of the flanged rim thereof as at 69 a free close sliding fit is established with the inner surface of the outer drum 2. Thus by the sliding fit established through the pins 25 and the apertures therefor at the rear of the inner drum and through the annular sliding contact at 69 at the forward end thereof, the drums 2 and 3 are maintained in coaxial alignment while the outer drum 2 is longitudinally movable with respect to the inner drum. A group of coil springs 70 supported between a radial shouldered portion of the inner drum 3 and a plurality of struck in tongues 71 formed in the outer drum 2 resiliently urge the outer drum rearwardly with respect to the inner drum.

Thus when any torque is transmitted through the helical spline 21—22, that is, between the torque gear 20 and the drums 2 and 3 there results an axially operative component of force which tends to effect relative longitudinal motion between the outer drum 2 and the inner drum 3. It will be noted that the torque gear or member 20 is connected through the over-drive and reverse mechanism to the driven shaft so that all the torque transmitted to or from the driven shaft by or upon the transmission mechanism is transmitted through the helical spline 21—22 and as will more fully appear, the resultant tendency to move the torque drum 2 fore or aft with respect to the drum 3 is employed according to the precepts of my invention to contribute to the operation of the mechanism, particularly in the selection and maintenance of the various gear ratios or reductions. It will be further noted that the torque gear 20 is rotatably mounted upon the sleeve 19 in a manner which permits such circumferential motion relative thereto as may be necessary to affect all the necessary axial movement of the drum 2 with respect to the torque gear or member 20 along the helical splines 21—22.

The inner drum 3 which has at its forward portion a greater diameter to accommodate the second speed gear assembly than the diameter at its rear portion, provided to accommodate the low speed assembly, is internally splined axially throughout both of said portions. The splines are preferably formed by depressed ribs 3c as shown in Fig. 1 and rather diagrammatically in Figs. 4 and 5. The splines may be economically formed during the initial drawing operation forming the drum.

A plurality of disks 16 preferably formed of material or composition providing suitable friction surfaces are splined at their outer peripheries and arranged in splined engagement with the rear end of the inner drum 3. The series of disks 15 provided with internal gear teeth at their inner peripheries are arranged alternately between the friction disks 16 and this assembly of toothed disks and splined disks may be hereafter referred to as the low speed clutch-gear or flexible ring gear in that rotation imparted to the disks 15 may be transmitted to the disks 16 and through the splines thereon to the drum 3 upon compression of the disk assembly.

A similar second speed clutch-gear or flexible ring gear is positioned in the forward part of the inner drum 3 and comprises the splined friction disks 14 having splined engagement with the drum 3 at their outer peripheries and cooperating with the toothed disks 13 to transmit torque from the planets 17—17a and sun gear 11 to the drum 3. The material forming the splined disks 14 and 16 is preferably a material which will have suitable frictional characteristics under the conditions existing within the transmission shown and I have found that an asbestos fabric impregnated with phenolithic resin is preferable in this connection. The driving disks 13 and 15 may preferably be made of a ferrous alloy and may be thickened at their inner toothed peripheries as shown in Fig. 1 to provide greater tooth bearing areas.

Referring particularly to the low speed clutch-gear assembly at the rearward portion of the drum 3, the disks 15 are proportioned to mesh with the three outermost gears 18a of the low speed planetary gear system supported by the gear carrier 30. In the absence of any pressure applied to the stack of driving and driven disks 15—16 rotation of the planetary gears upon their axes may merely turn the driving disks 15 with respect to the driven disks 16. When through means presently to be described axial pressure is applied to the low speed clutch-gear assembly, it will be understood that the drive through the driving shaft 10, the low speed sun gear 12, planetary gears 18—18a will transmit the torque through the low speed clutch-gear to the drum 3, through pins 25 to the torque drum 2, through the torque gear 20 and the over-drive mechanism to the driven shaft 100. Similarly, when axial pressure is applied to the second speed clutch-gear assembly, and when pressure is released from the first speed clutch-gear, the drive will be through the driving shaft 10 to the second speed sun gear 11 thereon, through the second speed planetary gears 17 and 17a, thence through the second speed clutch-gear to the inner drum 3 and as in the first instance to the driven member 100.

It will further be seen that when pressure is applied to effect a frictional drive through both the low speed and second speed clutch-gear assemblies at the same time, the planetary gears will cease to turn upon their own axes, the gear carrier will turn in the same direction as the driving member and the inner and outer drums and the gear carrier and the entire mechanism carried thereby will rotate as a unit with the driving shaft 10 and a direct drive will be established through the torque gear 20 and through the over-drive to the driven shaft 100. When the last described condition exists the transmission per se is in the normal direct drive or that speed which is known in the art as "high."

Figure 6:
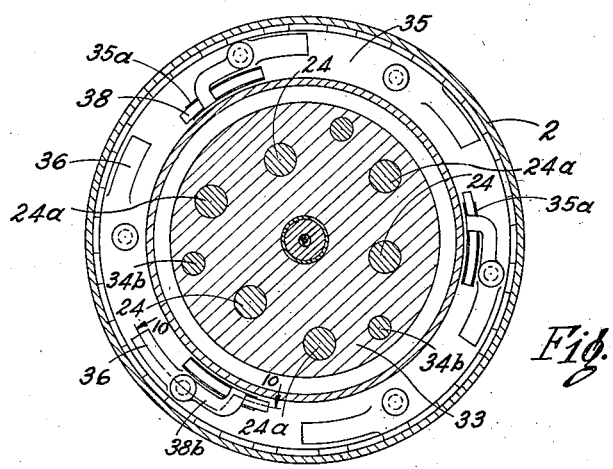
Figure 6 is a transverse section on the line 6—6 of Figure 1 and illustrates a mechanism hereafter referred to as the low speed gear starter.
Figure 10:
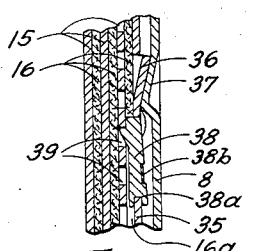
Figure 10 is a fragmentary sectional view on line 10—10 of Figure 6 and illustrates the pawl and ratchet assembly employed in the low gear starter.

To initiate the low speed drive I prefer to provide an improved low speed gear starter comprising a ring 35 arranged at the rear end of the low speed clutch-gear disks assembly, see Figs. 1, 6 and 10. The ring 35 is preferably flanged rearwardly at its inner periphery to bear against the rear radial wall 8 of the inner drum and is circumferentially slotted at spaced intervals 35a, see Fig. 6, to receive and support pawl members 38. The rearmost of the group of toothed driving disks 15 of the low speed clutch-gear is provided with a series of circumferentially spaced apertures 39, see Fig. 10, which cooperate with the noses of the pawls 38 to permit a pawl and ratchet engagement between the starter ring 35 and said disk. The rearmost friction disk 16 is interposed between the said apertured driving disk and the starter ring 35. Said friction disk is not splined to the drum 3 but is securely riveted to the ring 35 and is slotted as at 16a to accommodate the pawls 38, see Fig. 10. From the pawl and ratchet connection above described it will be observed that normal positive rotation through the driving shaft 10, sun gear 12, planets 18 and 18a and ring gear disks 15 including the rearmost apertured disk 15 will through the pawl and ratchet tend to rotate the starter ring 35 in the same direction as the said apertured disk.

The starter ring 35 is provided with a series of rearwardly stamped out cams 36 which cooperate with a similarly shaped series of cams 37 pressed forwardly out of the rear wall 8 of the inner drum 3. Rotation imparted to the gear starter through the pawl and ratchet 38—39 is effective through the cam reaction 36—37 to urge the entire starter ring forwardly toward the low speed clutch-gear disk assembly and compress said stack of disks against the radially extending abutment plate 29 secured to the inner drum 3. The plate 29 as shown in Figure 1 extends radially inward at about the mid-section of the drum and is secured to the radially shouldered portion of the drum as shown. Preferably there is interposed between the rearward face of the plate 29 and the forwardmost face of the foremost of the toothed driving ring gear disks 15 the forwardmost of the friction disks 16, which is preferably unsplined with relation to the drum, and is thickened an amount appropriate to effectively space the disks 15 in a proper longitudinal position to register with the teeth of the planets 18a, particularly when the whole assembly of disks 15 and 16 is compressed in active driving position. Driving torque from the forwardmost of the disks 15 is thus in part transmitted through the said forwardmost friction disk 16 to the plate 29 and thence to the drum 3.

Flat leaf springs 38b secured to the rear face of the gear starter ring 35 preferably by rivets as shown urge the pawls 38 into the apertures 39 of the driving disk. It will be observed, however, that when the drum 3 is rotated at a greater speed than the apertured driving disk that the cam reaction 36—37 will permit the starter ring to move back from a compressing position to an inactive position as shown in Figure 10, and that the starter ring 35 and pawls 38 will override the driving disk having the apertures 39. By virtue of the cam faces on the noses of the pawls 38 the pawls will be moved out of the apertures and the starter ring will be free to rotate with respect to the driving ring. The springs 38b, however, constantly urge the pawls forward about their forked pivotal connections 38a with the starter ring 35 and whenever the speed of rotation of the drum approaches equality to or tends to drop below the rotational speed of the driving disks in the low speed gear assembly the pawls are urged forwardly into the notches 39 and the drum is thereupon rotated in the manner shown by the driving disks of the low speed clutch-gear assembly.

Between the forward end plate 7 of the inner drum 3 and the forward end plate 5 of the torque drum 2 and arranged to rotate with drum 3 is a centrifugal governor, see also Fig. 3, which comprises a group of governor weights 50 arranged circumferentially about and formed to abut in their innermost idle position the inturned flange 7a of the inner drum cover plate 7. As shown in Figure 3 the governor weights 50 each define sectors which abut each other laterally in their innermost positions. Each of the governor weights 50 is grooved radially on the rear wall thereof as at 53, and is slotted co-extensively with said groove in its outer wall as at 53a to accommodate cams 55 radially mounted in radial slots 56 in the front wall 7 of the inner drum. The governor weights 50 are each cut away adjacent the inner edge of their forward faces to accommodate a series of retractor springs 52 extending from one governor weight to the other, which tend to hold the governor weights at their innermost position. Each of the governor weights is provided with a rectangular aperture arranged transversely of its radial groove 53 and a pair of rollers 51 are supported for free rotation in each of said transverse apertures. In each weight the rollers 51 are proportioned to have a greater longitudinal displacement than the thickness of the weight at the bottom of the groove 53, so that the rear roller projects into the groove 53 and is adapted to engage cam faces 60 and 61 of the cam 55. The forward roller 51 is normally substantially flush with the forward radial wall of the governor weight, but is adapted to project slightly beyond the forward face of the weight and bear against the smooth rear face of the cover plate 5 of the torque drum 2.

In response to rotation of the drums 2 and 3 the weights 50 will tend to move outwardly in response to centrifugal force against the restraint of retractor springs 52 and against the resistance of the cams 55 to outward movement of the rollers 51 thereover. The effect of this outward movement of the rollers 51 bearing on the cams 55 is to urge the drum 2 longitudinally forward and to urge the cams 55 rearwardly about their pivotal bearings 57 in the forward wall 7 of the inner drum 3. The cams 55 are free in the slots 56 to move rearwardly through the cover plate 7 and bear through arcuate notches against the annular rib 58 in the second speed starter ring 54, but are restrained from forward tilting in said aperture by flanges 59, see Fig. 3, which project laterally of the rear faces of the cams and bear against the inner rearward face of the plate 7 adjacent the apertures 56. Rearward movement of the second speed starter ring 54, which is interposed between the cams 55 and the second speed clutch-gear disks 13 and 14 effects a compression of the disk assembly against the radially extending abutment plate 29 to transmit torque from the planet gears 17—17a to the drum 3.

The movement of the cams 55 as affected by the outward movement of the governor weights above described is also affected by the reaction in the helical spline 21—22, which when the driving torque is positive tends to move the outer drum 2 rearwardly with respect to the inner drum 3.

When a high torque is being transmitted through the helical spline 21—22 a higher centrifugal force, that is a higher speed, must be developed in the governor weights 50 to effect an outward travel of the rollers 51 over cams 55. On the other hand, when the torque transmitted through the helical spline 21—22 is small or negative only a relatively small centrifugal force need be developed by the governor weights to effect an extreme outward movement of the rollers 51 over cams 55. In connection with the radial movement of the governor weights 50 and rollers 51 over the cams 55, it is to be observed that axial force transmitted through the forward rollers 51 to the wall 5 of the outer drum 2 is always equal and opposite to the reaction of the rollers upon the cams 55. Thus the axial pressure on the second speed clutch-gear disks is a function of the torque transmitted through the helical spline 21—22. On the other hand, the torque reaction tending to move or hold the drum 2 rearwardly will not of itself effect a movement of the cams 55 unless the rollers 51 are drawn outwardly or maintained outwardly by the governor on the operative portions of the inclined surfaces of the cams 55.

When the rollers 51 are moved outwardly over the cams 55 beyond the point of their pivotal support 57 on the cover plate 7, and thereby permit the "squeeze" in the rollers 51 to be effective to move the cams and compress the disks of the second speed clutch ring gear 13—14. This compressive movement causes the toothed disks 13 to frictionally engage the splined friction disks 14, and tends to bring the disks 14 and the drum 3 up to the higher rotational speed of the disks 13, and thereby cause the drum to rotate more rapidly than it had been driven through the first speed clutch ring assembly. As above described, the tendency of the drum to overrun the first speed drive automatically releases the first speed-clutch-gear and permits the exclusive establishment of a second speed drive through the second speed clutch-gear. Assuming for the moment than when the second speed drive is thus exclusively established, the rollers 51 have advanced to the resistance face 61a (see Fig. 20) between the operating cam surfaces 60 and 61, it will be appreciated (1) that the angle of the cam surfaces 60 and 61 will have been reduced with respect to the radial plane, and (2) that further outward radial movement of the rollers 51, particularly over the cam faces 61, will mainly tend to draw the drum 2 forwardly with respect to the drum 3 rather than to move the cams 55 rearwardly with respect to the drum 3 or its cover plate 7.

When, as above indicated, the drum 2 is moved forwardly with respect to the drum 3 by radially outward movement of the rollers 51 induced by the governor weights 50 over the inclined cam surfaces 61, the pins 25 engage the low speed gear starter ring 35 and move it bodily forward, and thereby compress the low speed clutch ring gear assembly 15—16, and thereby tend to reduce and eliminate relative movement between the toothed and splined disks of this assembly. The effect of engaging the low speed clutch ring gear 15—16 while the second speed clutch ring gear 13—14 is held in engagement is to reduce all relatively internal movement in both planetary systems, bring the carrier 30 up to the speed of the driving shaft and rotate the drums 2 and 3 at the speed of the driving shaft.

To insure a release of the low speed clutch-gear prior to engagement of the second speed clutch-gear the splines of the friction disks 16 of the low speed clutch-gear are proportioned to have a slight movement with respect to grooves in the drum 3. See Fig. 5. The slight amount of initial overrunning movement of the drum 3 induced by the second speed engagement thus permits the drum carried cam 37 to have a substantial movement with respect to cam 36 of the starter ring 35. Since the engaging pressure between the friction disks 16 and the driving disks 15 is relieved by this preliminary cam movement the low-speed clutch-gear is fully released and cannot "drag" after the second speed clutch-gear causes the said overrunning movement.

It will be observed that the foremost friction disk 16 is unsplined and functions to temper the releasing action above described in its frictional engagement with the plate 29 of the drum on its forward face, and against the foremost toothed disk 15 on its rear face. Thus a part of the engagement between the friction disks and the toothed disks tends to be continued to the extent of the drive through said unsplined friction disk. Among the advantages that result from the provision of the unsplined disk above described is that any tendency of the low speed clutch-gear to "chatter" by reason of the lost motion in the splines is obviated. Although the frictional drive maintained by the foremost unsplined disk is a relatively small part of the total drive, I have found it to be sufficient to prevent a "chatter" of the low speed clutch occasioned by unevenness in torque load while in low gear, and to contribute to a smooth release of low-gear as second speed gear is engaged.

As heretofore stated, axially extending pins 25 are carried by the rear radial wall of the outer drum 2 and protrude through the rear radial wall of the inner drum 3 adjacent to the low speed starter ring 35, see particularly the lower portion of Fig. 1. When the second speed drive has been exclusively established the first speed starter ring 35 has assumed its rearmost position, as shown in Fig. 1, and the forward ends of the pins 25 are proximate thereto, but preferably spaced therefrom perhaps a little less than shown in Fig. 1, albeit the absolute spacing of the pins from the ring at this point may vary within reasonably wide limits to allow for wear of the friction surfaces and other parts. Preferably the forward ends of the pins 25 extend far enough into the zone of the cam ring 35 to be positioned in the path of the heels of cams 36 to prevent rotation of ring 35 when the splined disks 15 are overrunning the disks 16 by the engagement of the second speed clutch.

Since the position of the governor weights in their outward travel is governed by rotational speed and torque and since their position determines the engagement of second speed and the establishment of direct drive, it will be understood that normal wear in the clutch-gear disks might in the absence of a wear compensating means, vary the conditions required to effect second speed or direct drive. I conceive that the thickness, for example, of the splined friction disks 14 and 16 determines the longitudinal position of the rollers 51 with respect to the drum 2. The resilient mounting of the cover plate 5 through springs 5a provides a mounting which compensates for the wear or differences in thickness in the clutch-gear disks and permits the governor weights to bottom against the circumferential wall of drum 2 at high speeds regardless of the thickness of the clutch-gear disks. The bottoming of the weights thus limits the axial component through the rollers 51 against the cover 5. If the clutch-gear disks were thick enough to prevent bottoming and a rigid connection were maintained between the cover 5 and drum 2 it will be seen that at high speeds a tremendous axial component would result from the cam and roller reaction which would tend to force the cover 5 from the drum. The resilient mounting of the cover 5 thus provides that the wearing of the friction materials will not change substantially the conditions of speed and load designed to effect the establishment of second speed and direct drive. It will also be observed that since the torque reactions are transmitted through the cover 5 to the clutch-gears that torque shocks are transmitted through the springs 5a and that said springs thus function to measure and cushion the torque effect upon the clutch gears.

It is to be observed that the low speed clutch-gear is thus adapted to be actuated through the pawl, ratchet and cam gear starter of ring 35 and also to be actuated at a different time by the longitudinal movement of the outer drum 2 resulting from helical spline and centrifugal governor reactions. The first of said low speed clutch-gear actuations is to establish low gear alone and the second of said actuations is to establish a direct drive between the driving shaft 10 and the torque gear 20.

Referring back to the cams 55, the governors 50, and the rollers 51 carried thereby, as shown particularly in Fig. 20, it will be observed that I prefer to form the cams each with an inner operating face 60 and an outer operating face 61, both inclined to a radial plane of the transmission when the cam is idle. The face 60 is provided with an inactive or idle face 60a and the face 61 has a resistance face 61a.

To enable those skilled in the art to put my invention into practice more readily I will give the values of the governor weights and the inclination of the helical spline in torque gear 20 and cam angles which I have found to be successfully operative in a current model of motor vehicle weighing approximately 2600 lbs., with a motor developing 150 foot lbs. torque at 2300 R. P. M. and about 90 brake horse power at 3750 R. P. M. The combined mass of the governor weights totaled about 5¼ lbs. and a helical spline inclination at about 36° satisfactorily effected the various gear shifts. The inactive face 60a being inclined about 6° to the radial plane and joining the inner operating face which is inclined at about 12° to the radial plane. The first operating face 60 joins the resistance face 61a which is inclined at about 51° to the radial plane and the second operating face 61 which is inclined at about 36° to said radial plane. In connection with the above specific values given for the angle of the cam faces, it is pointed out that said angles are but one of the many factors which are selectively variable. The coefficient of friction between the engaging surfaces in the clutch gears was about .1 to .15. With the above specific values, I have obtained satisfactory operation of the transmission with a wide range of friction materials, although my present preference is for a material similar to that heretofore described. In this transmission the low speed gear ratio was 2.92 to 1 and the second speed gear ratio was 1.61 to 1.

From the foregoing example of specific values for cam angles and the like, which have been given to more fully illustrate a specific operative structure built in accordance with the precepts of my invention, it will be understood that some or all of the values given may be varied within reasonably wide limits without departing from the teaching of this specification, and that the values given above are given for the purpose of illustration and example.

When low gear has been established by the transmission of positive torque through the low speed starter above described, and the drums 2 and 3 are rotated as the vehicle is moved, the surfaces 60 which at that time are inclined in about the manner shown in Fig. 1 and the reaction through the helical spline 20—21 is transmitted to the rollers through the cover plate 5 of the torque drum and thereby through the inclination of the cam faces 60 tending to hold the rollers inwardly in about the position shown in Fig. 1. Under this condition the axial "squeeze" in the rollers is applied to the cams inside of their respective points of pivotal support 57 on the cover plate 7 of the inner drum 3, whereby no tendency results from the "squeeze" to move the cams rearwardly with relation to the said cover plate 7. When, however, the effect of the torque "squeeze" is overcome by the centrifugal force of the governor weights, the weights and rollers then move outwardly on the cam surfaces 60, and all other things being equal, it will be appreciated that once the governor weights have begun their outward movement a condition has been created under which they would normally tend to continue that outward movement against the same or substantially the same opposition. It will also be appreciated that other conditions do not remain the same, and that one of the essential changes of the conditions is that the second speed clutch-gear 13—14 is begun to be engaged with the result that the engine speed tends to be reduced, and that the kinetic energy available through the decreasing engine speed tends to add to the acceleration of or accelerate the vehicle, and that the latter tendency may measure an increase in torque through the helical spline which tends to increase the squeeze of the rollers 51.

To more fully provide against the continuance of an undesirable balance of forces which might unduly protract the slippage of the second speed clutch when engagement thereof is desired, I preferably provide that outward movement of the rollers 51 over the cam faces 60 be accompanied by an increasing mechanical advantage which reaches a ratio of one to one when the rollers are opposite the rib 58 on the ring 54, and which is preferably a little greater when the rollers reach the junction of the cam faces 60 and 61a as shown in Fig. 20. It will also be observed that by reason of the pivotal support of the cams 55, not only do the rollers have an increasing mechanical advantage in their outward movement over the cam faces 60, but also the rearward tipping of the cams reduces the effective angle of opposition to outward movement of the rollers. I provide, however, that the angle of the cam faces 60 be such that when the cams have tipped by compression of the second speed clutch-gear a maximum amount, there still remain a substantial angle between the cam faces 60 and the radial plane, so that a too rapid or grabbing engagement of the second speed clutch is prevented by reason of the ever present tendency of the torque reaction to squeeze the rollers radially inward, even though that tendency is modified as the rollers progress in their outward travel.

The foregoing description of a shift from first to second speeds has been premised upon the assumption that the engine throttle has remained substantially constant throughout the shift. In such a circumstance the kinetic energy available through slowing down the engine may preferably be dissipated in part through slippage of the second speed clutch and may in part be used to maintain a continuous driving effort or even a controlled acceleration of the vehicle during the shift. By the arrangement of cams, weights and rollers above described a minimum of energy is lost consistent with a smooth, rapid and positive engagement of the second speed clutch, a continuous torque is maintained and all objectionable tendency to grab is eliminated.

Under the conditions above described, it will be appreciated that by the time the rollers 51 have reached the resistance face 61a, while the cam faces 61 and 61a have assumed lesser angles with respect to the radial plane, they still present a greater angle to the rollers than does the face 60, whereby for a time at least under a condition of constant throttle opening and road loads effective to cause the shift from first to second, the rollers will tend to pause at the face of the resistance angle 61a until such a new increase in speed is established as to urge the rollers further outwardly over the newly presented inclined surfaces of the cam faces 61a. The cam faces 61a are relatively short in extent and are intended primarily to offer a greater resistance to outward movement of the rollers 51 than are the operating faces 61. Thus when the governor has developed enough centrifugal force to start the rollers over the "hump" of the resistance face 61a, it will tend to insure continued movement of the rollers over the cam faces 61, which then present a lesser angle of resistance, and force the drum 2 with the pins 25 forwardly to engage the first speed clutch 15—16 without undesirable slippage or lag during that engagement. It will always be appreciated, of course, that if the engagement tends to become too severe the torque reaction in forcing the rollers inwardly will tend to relieve the severity of the engagement. It will also be noted that when direct drive is thus established, the rollers 51 are then bearing on the outermost portions of the cam faces 61, and at a still higher mechanical advantage with respect to the rib 58 on the ring 54 to more fully insure the maintenance of engagement of the second speed clutch gear 13—14 during direct drive. As mentioned above the resilient support of the cover plate 5 of the torque drum 2 permits the governor weights to bottom radially against the cylindrical wall of the drum 2, whilst the squeeze in the rollers is maintained through the springs 5a holding the cover plate rearwardly.

While the foregoing has been premised on the assumption that a substantially constant driving effort has been imposed on the driving shaft and a substantially constant resistance developed by the driven shaft or at least the torque gear 20 of the transmission, as for example by driving on a smooth level road with the throttle held at a fixed opening while the shifts above described occurred, at least two other points are worthy of note in this connection namely the effect of change in transmitted load in the course of the period comprehended by the shifts, and the ability of the device to change speeds downwardly as well as upwardly.

With respect to changing the load in the period comprehended by the shifts, it will be appreciated that if just prior to a shift from first to second the throttle is partially closed so that the driving effort is in part reduced, the rollers will move outwardly more readily and more rapidly, and that the positive engagement of "second" speed may be very rapidly accomplished and maintained if the driving effort is not too rapidly reimposed on the system. For that matter, it will be understood that if the speed is sufficient just prior to the shift out of the low speed ratio, then a reduction in driving effort as by closing the throttle may readily accomplish a shift from low speed into direct drive by reason of the extreme outward movement of the rollers 51, and the compression of both the first and second speed clutches which will be maintained if the driving effort is not too rapidly re-applied to the system.

As to the ability of the device to shift down from a higher speed, the advantages referred to above which facilitate the shifts "upward" are equally available to facilitate the shifts "downward." For example, when the second speed clutch gear is exclusively engaged an increase in torque load or a decrease in speed or a combination of those conditions sufficient to initiate an inward movement of the rollers 51 along the cam surfaces 60 will, by reason of the decreasing mechanical advantage of the rollers with respect to the cams 55, increasingly facilitate the inward movement of the rollers and the release of the second speed clutch-gear, and prevent a "hanging on" of the second speed clutch-gear when the speed and load conditions demand a rapid shift to low to most advantageously meet the newly imposed conditions of higher torque and lesser speed.

As least as between the torque gear 20 and the driving shaft 10, driving conditions may well arise when negative torque loads are imposed upon the transmission, i. e. when the torque gear 20 tends to drive the driving shaft 10. If such a condition arises when the transmission has established direct drive, as above described, the reaction through the helical spline 21—22 will urge the drum 2 forwardly with respect to the drum 3, forcing the pins 25 forwardly and compressing the low speed clutch-gear, and tending to relieve the squeeze in the rollers 51. So long, however, as the vehicle speed maintains the governor weights 50 in their outermost radial positions as is normal in high or direct drive, then the squeeze in the rollers will be maintained essentially by the governor weights, since the cover plate 5 of the drum 2 is limited in its forward movement with respect to the cover plate 7 of the drum 3 by reason of the pins 25 comprising the first speed clutch and by the compression of the springs 5a. Since the rollers 51 are acting on the outer ends of the cams 55, and at a great mechanical advantage with respect to the second speed clutch-gear, direct drive can very conveniently be maintained while such negative torque is imposed until the vehicle reaches a very low forward speed. When, however, a very low forward speed is reached, which those skilled in the art will appreciate can be determined by the masses of the governor weights, the inclination of the cams, the strength of the springs 70 and 5a, and the like, then the second speed clutch gear may be released which will result in effective disengagement of the driving shaft 10 from the torque gear 20 through the overrunning of the carrier with respect to the housing as permitted by the one-way clutch 76—80. Of course, if the speed should tend to increase after the release of the second speed clutch, outward movement of the governor weights would re-occur and re-engagement of the second speed clutch would re-establish the condition above described.

If the transmission were running in an established low or second speed when negative torque is imposed upon it, then for reasons inherent in its construction the reactions would be substantially the same as above described, having in mind that one or two preliminary changes might take place while the drum 2 was moving forwardly and forcing engagement of the low speed clutch through the pins 25.

At least while transmitting positive torque from the driving shaft 10 to the torque gear 20 during the shift from one speed relationship to another, the forces acting to compress the respective clutch gears are controlled to be not substantially incommensurate with the torque to be transmitted. During the initial compression of the first speed clutch gear to initiate the low speed drive, the compressive forces arise from the cam reaction 36—37 as the starter ring 35 is rotated by the force of rotation of the driving load. The driving load being tempered by the master clutch C, because this is the period of its initial engagement, whether automatically in response to speed and transmitted torque, as I prefer and have described in my copending application Serial No. 18,811, or manually or otherwise. In the engagement of the second speed clutch gear it will be appreciated from the foregoing description that the compression of the disks thereof is measured by the "squeeze" in rollers 51, and although the squeezing effect is modified somewhat during the outward travel of the rollers over the pivoted cams 55, still the compression of the plates is not remote from the value of the transmitted torque as reflected through the helical spline 21—22. When the low speed clutch is compressed to effect a direct drive, the source of actuating force primarily comes from the governor weights 50 in opposition to the tendency of the torque reaction to draw the drum 2 rearwardly, but because of this reaction the governor weights are only able to accomplish their outward travel and compress the low speed disks when their force has become one not incommensurate with the transmitted torque.

The foregoing paragraphs have been directed to the parts of the transmission in which speed changes are effected in response to changes in torque load and rotational speeds in the transmission and the over-drive has been referred to merely as a means to transmit the torque from said torque and speed responsive parts to the driven shaft 100. The over-drive arranged within the case 9 identified generally at OD is so arranged that when the speed and torque conditions permit, it may be actuated to change the speed ratio between the torque gear 20 and the driven shaft and rotate the driven shaft 100 at a higher speed than said torque gear member. Thus for instance when the speed and torque responsive parts of the mechanism have established what has been referred to as a direct drive from the driving shaft 10 to the torque gear 20, the over-drive may be actuated to rotate the driven shaft 100 at a higher rotational speed than is imparted to the drive shaft 10 and the torque gear 20. Similarly when the torque and speed responsive mechanisms have established a low speed drive or a second speed drive to the torque gear 20 the over-drive mechanism may function to increase the speed of the driven shaft 100 beyond the speed of the torque gear member 20. Therefore it may be stated generally that the over-drive mechanism may effect a speed increase or different driving ratio for each of the three forward speeds and the transmission as a unit is thus effective to maintain and establish six forward speeds.

A second office of the over-drive mechanism is to provide a reverse gear drive to the driven shaft 100 and since the drive is at all times through the torque gear 20 and is responsive to the automatic speed changes within the forward part of the transmission, the reverse drive may be through the low speed, second speed or direct drive of the speed and torque responsive parts of the transmission.

Figure 8:
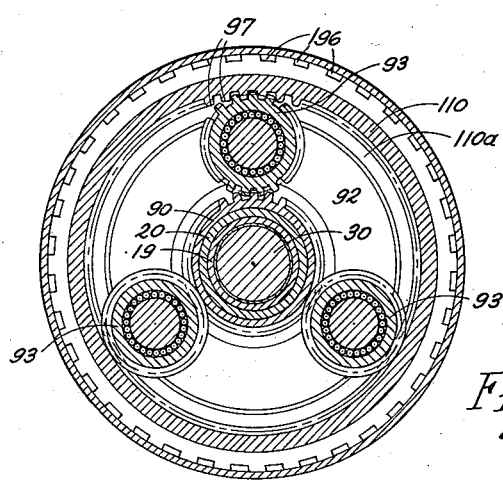
Figure 8 is a transverse section looking rearwardly on line 8—8 of Figure 1 and illustrates the planetary gear arrangement of the overdrive.

To transmit the torque imparted through the torque gear 20 to the over-drive mechanism an external gear 91 is splined at the rear end of the hub of the torque gear 20 and a planet carrier 92 having internal splines thereon is arranged to surround and have a splined engagement with said gear 91. The planet carrier 92 supports upon three equidistantly circumferentially spaced bearing pins, planet gears 93 (see Fig. 8). The planet gears 93 are disposed forwardly of the splined engagement between carrier 92 and the gear 91 and are adapted to engage a sun gear 90, the hub of which surrounds the hub of the torque gear 20. The sun gear 90, although mounted through the hub portion thereof to have relatively free rotation with respect to the torque gear 20, is provided at its forward outwardly flanged end with an overrunning clutch 89 (see Figs. 1 and 7) which is effective to prevent the sun gear 90 from overrunning the torque gear 20. This arrangement permits the torque gear 20 to rotate freely even though the sun gear 90 may be restrained by means hereafter described, and permits that the sun gear 90 may rotate in the same direction as torque gear 20 at any speed up to the rotational speed of the torque gear 20. The forward outwardly flanged portion of the sun gear 90 extends radially beyond the clutch 89 and is provided with a series of gear teeth 87 which are adapted to receive splines 86 formed on the internal periphery of the friction disk 85. The friction disk 85 is positioned between a radially inwardly extending flange 85a on the rear end of the main transmission casing 1 and an over-drive actuating ring 105. In the absence of any restraint imposed upon the friction disk 85, the disk will freely rotate with the sun gear 90 by reason of the splined connection 86—87.

The planet carrier 92 which supports the planetary gears 93 is surrounded by and freely rotatable within a ring gear 110 which has geared engagement with the planets 93. The hub portion 98 of the ring gear 110 is offset rearwardly with respect to the planet carrier and surrounds the driven shaft 100 where it is internally splined to co-operate with longitudinally extending splines 99 of the driven shaft 100. An annular groove is provided in the outer surface of said hub portion 98 to receive a shifting yoke 101 of the over-drive and reverse shifting mechanism. The internal periphery of the ring gear 110 is provided with internal gear teeth 97 in that part which surrounds planetary gears and said planetary gears 93 are in constant mesh with the internal gear teeth 97.

I prefer that the splined connection between the ring gear 110 and the driven shaft 100 as well as the splined connection between the planet carrier 92 and the torque gear 20 be sufficiently free to permit a limited lateral bodily shifting of both the ring gear 110 and the planet carrier 92 with respect to the axis of the floating sun gear 90, whereby the tooth pressures between the floating sun gear 90, the planets 93 and the ring gear 110 will be permitted to give a self-centering movement to the several gears in the planetary train with respect to each other, whereby to insure equal distribution of tooth loads and quiet operation of the over-drive mechanism.

In the operation of the transmission in direct drive without the use of the over-drive as such, the torque is transmitted through the torque gear 20, through the hub gear 91 and the planet carrier 92 to rotate the same. The sun gear 90 through the medium of the roller clutch 89 provides a reaction for the planets 93 in mesh therewith, and the torque gear 20, the sun gear, planets 93 and ring gear 110 rotate in unison in the same direction to transmit the direct drive of the torque gear 20 to the driven shaft 100. When, however, the friction disk 85 is restrained from rotation the sun gear 90 through the spline connection 86—87 is restrained from rotation with the torque gear 20 and as the planet carrier 93 is bodily rotated at the speed of torque gear 20 by reason of its engagement with the gear 91 and the planets 93 are not only moved bodily at the speed of the torque gear but are also caused to rotate on their own axes in a manner to increase the speed of the ring gear. The rotation of the planets 93 upon their own axes is transmitted to the internal teeth 97 of the ring gear 110 and thus the ring gear 110 is rotated at a higher speed than the torque gear 20 and an over-drive or overspeed is effected.

In the over-drive as in the change speed gears the gear teeth may be straight spur teeth or may, if desired, be helical and in the latter event the splined engagement between the over-drive ring gear 110 and the driven shaft 100 is preferably helical. In the latter splined connection however at 98—99 the inclination of the helical splines is preferably less than inclination of the helical splines between the gear carrier 92 and the splined portion 91 of the torque gear 20. The end thrust in the over-drive assembly is thus delivered to the sun gear 90 which in turn bears against the torque gear 20 through a suitable thrust bearing 90a. The torque gear 20 through the inner drum 3 and parts associated therewith transmit their end thrust to gear carrier 30 and thence to the thrust washer W adjacent the end of the driven shaft 100. The helical spline and helical gear assembly in the over-drive as above described provides a quiet, smooth running balanced unit.

To restrain the friction disk 85 from rotation and thereby hold the sun gear 90, a separately controlled actuating ring 105 is arranged to frictionally engage the forward face of the friction disk 85. The ring 105 is provided at its outer edge with a forwardly extending peripheral flange having a plurality of circumferentially inclined cam surfaces 106, see Fig. 7. A series of circumferentially and symmetrically spaced pins 108 project through the wall of the main casing 1 immediately forward of the peripheral flange of the actuating ring and the inner ends of said projecting pins are provided with rollers 107 which are arranged to co-act with the cam surfaces 106 formed in said peripheral flange. At one side of the main casing a projecting boss is formed which pivotally supports a shaft 115 having a disk 116 at its inner end provided with an eccentrically offset roller 117 positioned within a notch in the peripheral flange of the actuating ring 105.

The notch in the peripheral flange which receives the roller 117 has a close fit with the roller 117 and when the shaft 115 is rotated by means of the lever 115a at the outer end thereof the roller 117 by virtue of its eccentric mounting will rotate the actuating ring 105 within the main casing 1. Bodily rotation of the actuating ring 105 will through the cam and roller reaction 107—106 move the actuating ring rearwardly with substantially equal axial pressures exerted over the whole of the friction disk 85 against the transmission housing and engage the friction disk 85 to establish over-drive as heretofore described. The frictional engagement of the disk 85 between the flange 85a on the main housing 1 and the actuating ring 105 permits a smooth initiation or release of the over-drive mechanism. I prefer that the inclination of the cam surfaces 106 be so arranged with respect to the direction of rotation of the friction disk 85, and the movement of the ring 105, that a self-energizing effect will be avoided when engaging the disk 85 to establish the over-drive.

Movement of the lever 115a to move the actuating ring 105 into or out of engagement with the friction disk 85 to put the over-drive into effect or to release it can, as those skilled in the art will understand, be effected by any convenient means, such, for example, as a manually operated Bowdin control (not shown). Apart from the specific means for controlling the over-drive, I prefer that its control be effected by the following method. The method which I prefer is that the over-drive be engaged and be operative in all or substantially all of the gear ratios or speeds of the transmission proper so long as the engine load remains a determinable amount less than its maximum. Thus, according to my preferred method of controlling the over-drive, I would cause or permit the over-drive to be in effect for all or substantially all conditions of driving the vehicle where less than maximum acceleration or performance are desired, and thereby take greater advantage of the flexibility of the transmission while requiring lesser engine speeds relative to vehicle speeds.

For example, according to my preferred method of controlling the over-drive, I would cause or permit the over-drive to be engaged and operative from the period of starting the vehicle through the first, second and high speeds of the transmission, so long as the driver demanded a determinable amount less than maximum acceleration or maximum performance in that range of operation. On the other hand, according to my preferred method of controlling over-drive, I would cause the over-drive to be disengaged in any of the three gear ratios, which the transmission per se automatically selects, when demand is made for maximum performance, and thereby gain in each or all of the speeds or gear ratios the maximum mechanical advantage of the prime mover with respect to the driven shaft. Where the characteristic of the prime mover is such that maximum speed can be obtained only through use of the over-drive, and where maximum performance such as acceleration can be obtained only without the over-drive, then in that event, according to my preferred method of control, I would cause the over-drive to be ineffective in the range of speeds where maximum performance or acceleration characteristics were sought, and then cause the over-drive to come into effect where maximum speed was then found to be desirable.

To carry out the method of the over-drive control outlined in the preceding paragraphs I preferably employ a vacuum responsive system such as shown in Figures 21 and 22. Generally speaking, this system comprises a vacuum cylinder and valve connected to the intake manifold of the vehicle motor and a piston within the vacuum cylinder operatively connected to the over-drive control shaft 115 in the transmission.

As diagrammatically shown in Figure 21 the vacuum cylinder 400 is preferably mounted on the transmission casing while the control valve or valves 410 therefor are preferably mounted on the forward side of the "dash board" of the vehicle body, the same being preferably connected by a flexible hose 414 to permit relative movement therebetween without effecting the operation of the control mechanism. A manually operated control rod 412 extends from the valve mechanism 410 and preferably projects through the instrument panel 413 in a position conveniently accessible to the operator of the vehicle. The valve mechanism 410 is in communication with the engine intake manifold IM through a tube 411 leading from the upper end thereof to the intake manifold, and joining the manifold at a point between the throttle valve and the intake ports of the engine. Within the cylinder 400 is a piston 420 preferably having appropriate sealing means well known in the art, whereby the piston is drawn upwardly when communication between the reduced pressure of the manifold is established in the upper portion of the cylinder through the valve mechanism 410 and conduits 411 and 414. The lower or opposite side of the cylinders 400 has a free communication to atmosphere as at 415. The piston is connected through piston rod and appropriate connecting and adjusting means shown at 421 with a lever 422 secured to the shaft 115. A spring 441 opposes the upward movement of the piston and tends to rotate the shaft 115 to establish direct drive from the change speed mechanism to the propeller shaft of the vehicle. Upward movement of the piston induced by the manifold vacuum will cause rotation of the shaft 115 to establish the over-drive relationship between the change speed gearing and the propeller shaft.

The valve 410 is preferably constructed so that the control rod 412 therefor may be moved to three different positions to obtain three distinct conditions of over-drive control. As indicated at a in Figure 21, when the operating rod 412 is in its innermost position, the valve parts are disposed as shown in full lines in Figure 22 wherein the plunger part 425, which is connected to the rod 412, is in a position to shut off the vacuum conduit 411. In this position the plunger 425 cuts off communication between the manifold IM and the space above the weighted plunger 428 and admits atmosphere to that space through the notch 425a in the lower face of the plunger 425. Therefore, as there is no suction above the plunger 428, it will remain in the position shown in full lines in Figure 22 and thus atmospheric pressure will be admitted to the cylinder 400 above the piston 420 through the conduit 414, the ports 434 and 436, and around the reduced portion 435 of the plunger 428. A second function of control rod in the innermost position a is effected through a collar 443 which bears against the pivoted lever 442 and maintains the valve 440 in an open position. Thus with the control button in its innermost position, the vacuum cylinder and piston 420 are inoperative and the arm 422 is swung downwardly by the spring 441 to move the control shaft 115 to a position establishing "direct drive." Accordingly, with the control rod in its innermost position, the over-drive will be positively disengaged and the drive from the transmission to the propeller shaft will be direct regardless of changes in manifold vacuum.

When the control rod 412 is moved to the position b, the parts 425, 426 and 427 are moved bodily to the right to a position between the full line position and the dotted line position shown in Figure 22. In this position, the reduced portion 426 is partially in alignment with the conduit 411, thus opening communication betwen the conduit 411 and the space above plunger 428 and closing communication through the notch 425a. The weighted plunger is free to move vertically in the sleeve 437 within the limits determined by the pin and slot connection 432—433, and when the manifold vacuum becomes sufficiently great the plunger will be raised to a position in which the ports 434 and 436 in the sleeve 437 are closed by the lower portion of said plunger, and the slot 430 which communicates with the hollow interior 429 of the plunger 428 uncovers the port 431 in chamber 438, thus providing communication between the intake manifold and chamber 438. The valve 440 within the chamber 438 is also held open in position b by the collar and lever 443—442 and thus the manifold vacuum acts through conduit 414 to reduce the pressure in the cylinder 400 above the piston 420. The piston 420 is then moved upwardly by atmospheric pressure and through rod 421 and lever 422 rocks the shaft 115 to establish the "over-drive."

The over-drive is engaged and maintained in engagement and communication between the cylinder 400 and the manifold is maintained only so long as the manifold vacuum is sufficient to lift the weighted plunger 428. If the manifold vacuum is reduced for any reason to a point where the vacuum is insufficient to maintain the weighted plunger in its raised position, the plunger will drop down to the full line position shown in Figure 22 with the reduced portion 435 in alignment with the ports 434 and 436, thus admitting atmospheric pressure to the conduit 414 and cylinder 400 above the piston 420 and thus permitting the spring 441 to rock the shaft 115 and disengage the over-drive.

The over-drive will remain disengaged until such time as the manifold vacuum again becomes sufficient to raise the plunger 428. I preferably proportion the plunger 428 with relation to its effective area and weight so that when the manifold pressure is about two pounds per square inch less than atmospheric pressure the plunger will be raised to align the ports 430 and 431, and thus place the cylinder 400 in communication with the intake manifold. In specifying the manifold depression of about two pounds as the value which I prefer to be necessary to raise the plunger 428, I have had in mind a value which I have found satisfactory on the vehicle concerning which I have given a more specific description elsewhere in this specification. I do not intend that the value of two pounds manifold depression be arbitrarily taken for all vehicles and engines, but rather I have in mind that the weight and effective area of the plunger preferably be such that it will not be lifted by any manifold depression that is developed in the manifold with wide open throttle within the whole range of engine speed for normal operation of the vehicle. I also preferably design cylinder 400 and proportion the area of the piston 420 with respect to the force required to engage the over-drive so that any manifold vacuum sufficient to raise the plunger 428 will be at least sufficient to engage the over-drive clutch without undesirable slipping. By reason of this design and by reason of the fact that atmospheric pressure is admitted to the topside of the piston as soon as the plunger 428 drops, any undesirable tendency for the over-drive clutch to be partially but not fully engaged is avoided.

When the manual control 412 is in the position b as described above and the plunger 428 is responsive to variations in manifold vacuum, the system may be said to be in "automatic over-drive," since when for example maximum acceleration of the vehicle is demanded, such as would be indicated by wide open throttle, the over-drive is automatically disengaged. When the demand for such maximum performance has ceased, however, the increase in manifold vacuum will move the plunger 428 to its raised position to again place the transmission in over-drive.

In the event that the operator desires positively to maintain the transmission in "over-drive," a third position of the control rod and valve parts is provided. This position is indicated at c in Figure 21 and provides that parts 425—426—427 may be moved farther to the right or to the dotted line position shown in Figure 22. When the valve parts are moved to the c position, the collar 443 is no longer effective to support the pivoted lever 442 and the valve 440 is free to drop and function as a check valve. When the rod 412 and the parts 425—426—427 moving therewith are positioned as in dotted lines to permit the lever 422 to assume its lowered position the plunger 428 is responsive to the manifold vacuum and may be raised thereby to align the ports 430—431 as in "automatic over-drive." When, however, the manifold vacuum is reduced and the plunger drops to the position shown in Figure 22, the valve 440 also drops and functions to seal the conduit 414. Thus although atmospheric pressure is established in the chamber 438 by reason of the openings 436 and 434, the valve 440 prevents air from entering the cylinder 400 above the piston 420. Since the position of the piston 420 in the cylinder 400 is one which is maintaining over-drive and the closure of the valve 440 is preventing a change of this condition, the transmission will remain in over-drive regardless of the variations in manifold vacuum. This position of the valve parts may be desirable where the gear ratio provided in the over-drive is demanded in connection with a wide open throttle such as at very high speed. It will be observed that any reduction of throttle opening, such as would increase the manifold vacuum, would merely serve to raise the plunger 428 and valve 440 and further exhaust the air from or maintain the partial vacuum in the cylinder 400.

Figures 14, 17, 23:
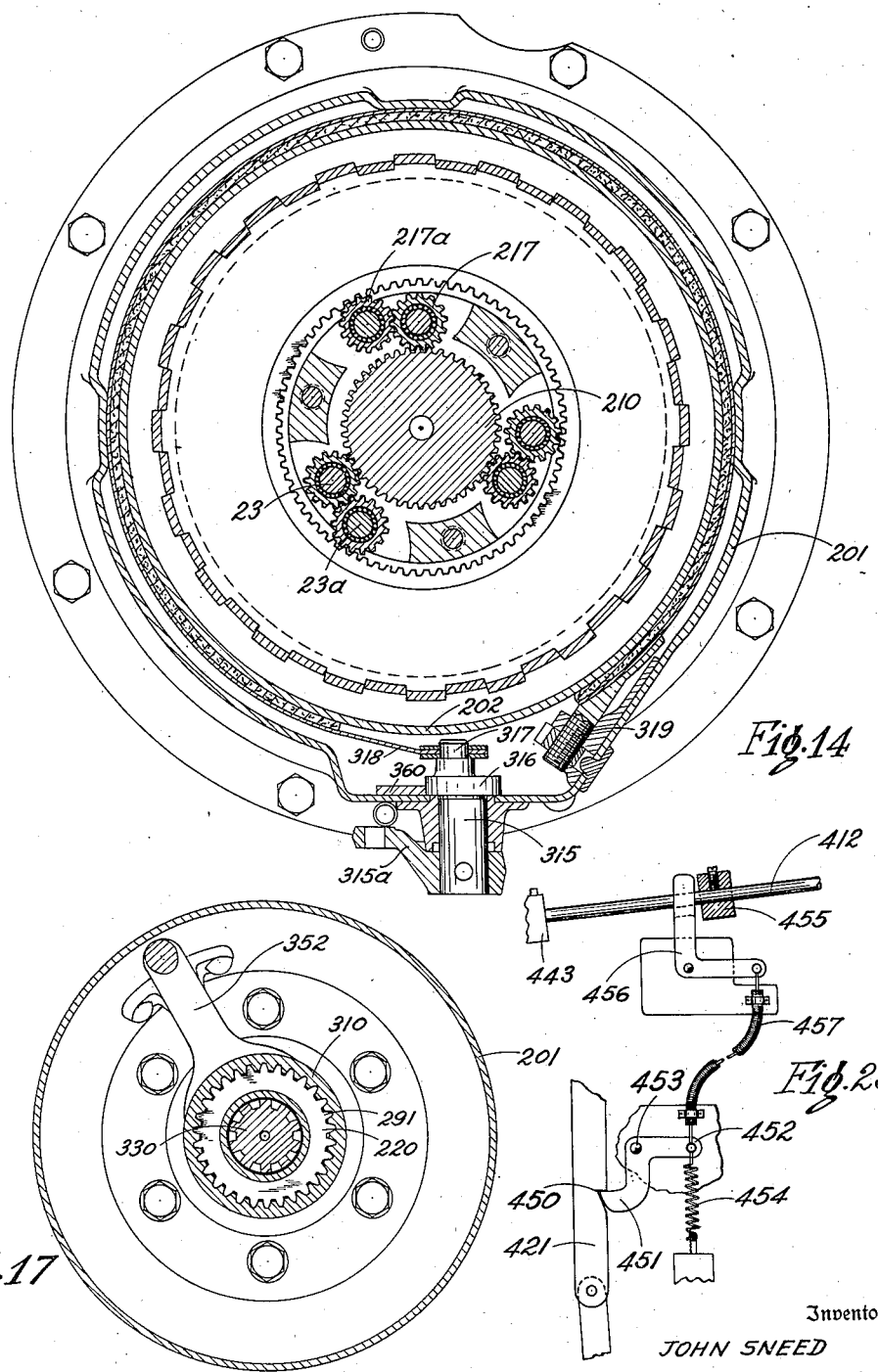
Figure 14 is a transverse sectional view looking forwardly on line 14—14 of Figure 11 illustrating the second speed planetary gear assembly and the transmission brake employed to effect a reverse drive.
Figure 17 is a transverse sectional view looking rearwardly on line 17—17 of Figure 11 showing the yoke and shifting means employed in connection with reverse drive.
Figure 23 is a fragmentary diagrammatic illustration of a latch mechanism that may be embodied in the over-drive control.

Although I have found the foregoing provision to maintain the over-drive positive to be quite satisfactory, I contemplate that through wear or leakage or otherwise conditions may arise where it would be advantageous to have an additional mechanical means to guarantee the maintenance of the over-drive when so desired in position c, as for example under the condition of sustained extremely high speed with wide open throttle. To that end one may employ the latch mechanism illustrated in Figure 23 in connection with the mechanism heretofore described. Thus in the piston rod 421, a portion only of which is shown in this figure, a notch 450 may be cut for receiving a latch 451 carried on the end of a bell crank 452, which is pivoted on any convenient point 453 on the transmission. A spring 454 secured to the remote end of the bell crank is arranged to tend to rotate the bell crank clockwise as shown in Figure 23, tending to force the latch 451 into the notch 450 when permitted to do so.

On the control rod 412 which, as heretofore described carries the collar 443, I prefer to provide an additional collar 455 against which the bifurcated end of a bell crank 456 may bear, and be drawn thereagainst by the spring 454 preferably through a flexible connection such as a Bowden control 457. As shown in Figure 23 the parts are in the condition for position c as above described, i. e. the rod 412 has been moved to its rearmost or extreme right hand position, as indicated in dotted lines in Figure 21. In this position the latch 451 may enter the notch 450 in the piston rod 421 and maintain it in its uppermost position once the piston has been raised thereto as previously described. When, however, the control rod 412 is moved forwardly to the left either to position a or b, the resulting counter-clockwise rotation of the bell crank 456 will, through the Bowden control 457, draw and maintain the latch 451 out of operative relation with the notch 450 and take no part in the function of the apparatus in either of the positions a or b as above described.

With the foregoing means and mechanism I have satisfactorily performed my preferred method of controlling the over-drive, and have obtained the other advantages attendant upon its operation.

Figure 9:
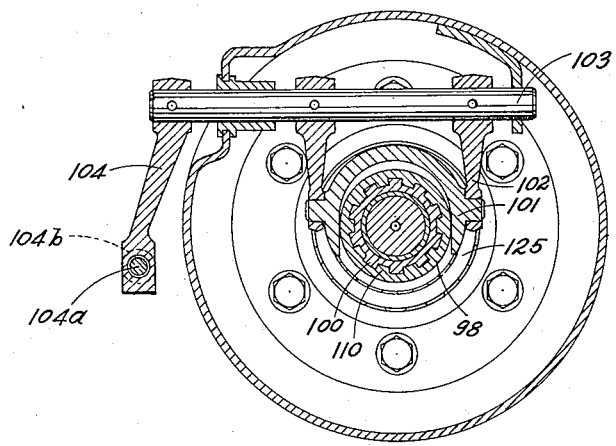
Figure 9 is a transverse section on line 9—9 of Figure 1 and illustrates the yoke shifting mechanism employed to effect a reverse drive of the vehicle.

Generally speaking, the over-drive mechanism may be converted into a reverse gear by longitudinally shifting the ring gear 110, planet carrier 92 and planets 93 longitudinally rearwardly as a body and restraining rotary movement of the planet carrier while engaging the planets directly with the hub gear 91 and disengaging the planet carrier therefrom. To facilitate the bodily movement of all of the parts above mentioned without permitting substantial reiative longitudinal movement therebetween, I have provided first an antifriction washer 110c carried by the ring gear 110 to bear against the rearward body portion of the planet carrier 92 with a free sliding fit to move the planet carrier 92 forwardly when the ring gear 110 is moved forwardly. To carry the planet carrier 92 rearwardly when the ring gear is moved rearwardly, I provide a larger ring, preferably an antifriction washer 110a, secured in the rearward zone of the teeth 92 of the ring gear by such means as a snap ring 110b, which bears against the forward side of an annular shoulder 92a of the planet carrier when the ring gear is moved rearwardly. As shown in Fig. 1 the planets 93 are restrained from moving rearwardly of the planet carrier by the hubs thereof lying adjacent to the forward face of the carrier, and are restrained from moving forwardly of the carrier by the annular plate or ring 95, which is carried on the forward face of the carrier. It will thus be seen that shifting of the ring gear by the lever 104, rock shaft 103 and yoke 101 (see also Fig. 9) carries bodily fore and aft the ring gear, planet carrier and planets along with the annular disk 95 as above described.

The disc 95 secured to the forward face of the carrier 92 is provided on its outer periphery with a series of splines 94 and said splines when moved rearwardly by means of the rock shaft actuation are arranged to engage a series of spaced toothed projections 196 circumferentially arranged on the inner wall of the over-drive housing 9. The effect of this arrangement is to secure the gear carrier 92 against rotation when the disc is moved rearwardly. The rearward movement of the carrier 92 moves the teeth on the inner periphery thereof out of engagement with the rear hub gear 91 of the torque gear 20 and moves the planetary gear 93 into mesh with the said hub gear 91. Positive rotation of the torque member 20, while the planetary system is thus displaced rearwardly, will through the rotation of the planets effect a reverse rotational movement of the ring gear 110 and the driven shaft 100 with which it is in splined engagement.

Figure 9A:
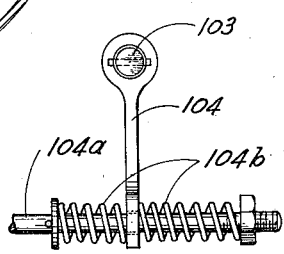
Figure 9A is sectional elevation of a resilient rock shaft actuating mechanism employed in my transmission.

As illustrated in Figure 9a the connection between the actuating lever 104 of the rock shaft and the actuating link 104a is preferably effected through a pair of springs 104b arranged on each side of an aperture in lever 104 and positioned by the end of link 104a passed therethrough. This resilient connection will facilitate the engagement of the gears 91, 92 and 93 in that it prevents the application of excessive pressures as would occur in an edge-to-edge engagement of the teeth in the event that they should be directly in line with each other. The connection through springs 104b thus provides an impositive shifting movement which permits the teeth of the gears to "feel" their way into mesh and consequently insures long gear life and smooth silent shifting.

As above mentioned the change speed parts of the transmission function in reverse in the same way they do in forward speeds. The result is that three automatic speed changes are provided in reverse drive under substantially the same conditions of engine speed and load as are provided in forward speeds. With the gear sizes in the over-drive and reverse mechanism about as shown in the drawings, there is, however, established in reverse an additional reduction through the reverse gearing in the ratio of about two to one, so that low reverse speed requires about twice as many revolutions of the engine per revolution of the driven shaft as does low forward speed. I believe it to be advantageous, however, to provide an extremely low ratio in reverse to meet conditions where an extreme ratio may be desired in moving the vehicle in a reverse direction, and since the change speed mechanism functions in reverse, it necessarily follows that a materially lesser reduction between engine speed and driven shaft speed may be obtained in reverse, when, for example, the automatic change speed mechanism has established "high reverse" in the operation of the vehicle.

To provide a non-driving or neutral position, the proportions of the parts and the longitudinal spacing between the teeth of planets 93 and the internal teeth of the gear carrier 92 are such that the ring, carrier and planets in their travel to a position establishing reverse drive traverse an intermediate position where neither the teeth of the carrier 92 nor the teeth of the planets 93 are in engagement with the hub gear 91 of the torque member 20. Suitable means may be connected to the outer end of the lever 104 of the rock shaft 103 to shift the over-drive and reverse assembly to effect respectively forward, neutral and reverse drive in the order named.

I prefer that the width, i. e. longitudinal dimension as shown in Fig. 1, and spacing of the teeth of the planet gears 93, floating sun gear 90 and driving sun or hub gear 91, be such that at least the rearward ends of the teeth of the gear 90 remain engaged by the planets 93 while the planets are also engaged with the gear 91 during reverse drive, and that the rearward shifting movement into reverse preserve this situation so that a subsequent shift into forward drive will not be encumbered with the necessity of reengaging the planets 93 with the sun gear 90. During reverse drive the sun gear 90 normally plays no active part since it is simply carried along at the same speed as the torque gear 20. Where the planets 93 remain in engagement with the sun gear 90 during reverse drive, any restraining effect imposed upon rotation of the sun gear 90 as through the friction disc 85 would simply act as a brake. In this embodiment of my invention, the over-drive control should be rendered inoperative as in position $a$ when reverse drive is established, preferably by any convenient interconnecting means, not shown. On the other hand, where it is not desired to have available the braking effect through the friction disk 85 during reverse drive, then the rearward portions of the teeth of the sun gear 90 may be cut away so that the pinions 93 engage only the hub gear 91 during reverse drive.

A third office and advantage of the over-drive structure above described is that of a "no-back" brake. Numerous devices have been supplied to provide an automatic means to restrain the tendency of the motor vehicle to roll back down grade. In a motor vehicle equipped with the transmission of my invention it will be observed that the negative rotation imposed upon the shaft 100 by the tendency of the car to roll back down grade while in any forward speed is transmitted to the ring gear 110 thence to planets 93, which are in mesh with sun gear 90. Said sun gear, however, is held stationary by the over-drive control and the tendency of the planets to impart their negative rotation through the gear carrier 92 to the torque gear 20 is opposed by the roller clutch 69 intermediate the sun gear 90 and the torque gear 20. Thus the entire negative rotation induced by the backward rolling of the vehicle is taken through the sun gear 90 to the friction disk 85. The friction disk 85 (as heretofore described) will be automatically held between the radial surfaces of ring 105 and the transmission case flange 85a and the vehicle will be effectively restrained from any reverse motion without any voluntary action upon the part of the driver so long as the over-drive is maintained whether by my preferred method or otherwise.

Since I prefer that the inclination of the cams on the ring 105, as above stated, be arranged so as to be non-self-energizing in their effect for normal engagement of the over-drive during forward movement of the vehicle, it follows that in engagement, when the mechanism functions as a "no back" brake, the effect of the inclination of the cams on the ring 105 will be self-energizing in restraining the vehicle from backward movement on a hill-side in any forward speed. I appreciate that the extent of the self-energizing effect in and for this circumstance can be varied through a substantial amount depending on the result desired for operation of the vehicle.

Figure 11:
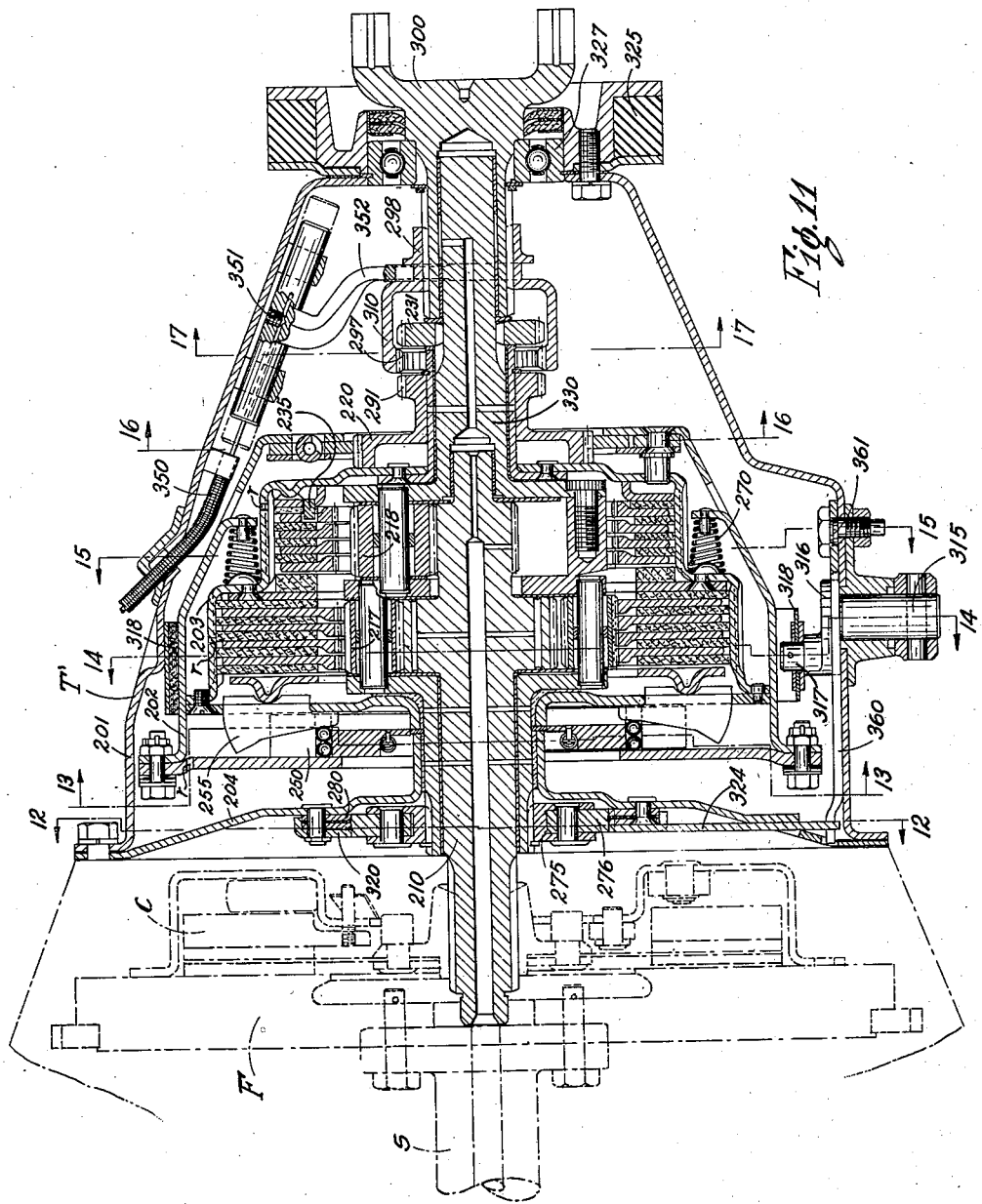
Figure 11 is a longitudinal section of a modified form of my invention wherein the over-drive mechanism of the preferred embodiment is omitted.

To lubricate the bearings and other working parts of my transmission, both in the preferred form shown in Fig. 1 and in the modified form shown in Fig. 11, I prefer to conduct lubricant under pressure from the prime mover first through the driving shaft from the end of the crank shaft S and then to the tail shaft of the main gear carrier and by suitable transverse passages to lead the lubricant laterally to the bearings and other points where lubrication is necessary. I also prefer to provide suitable and sufficient apertures in the peripheral portions of the inner drum, which carries the flexible gears, and the torque drum, so that lubricant may be freely ejected therefrom by centrifugal force and returned at least by gravity to the engine sump through suitable apertures, not shown, in the stationary transverse partition walls of the transmission casing so that no substantial quantity of lubricant other than that present on the surfaces intended to be lubricated will be carried around bodily by the rotating parts. The rotation of the parts will not only serve to purge the drums of any unnecessary surplus of lubricant, but will also induce the flow thereof from the central axial passages to the more radially distant parts to be lubricated.

Referring particularly to Fig. 1 by way of illustration I propose that the axial lubricating hole normally found in the center of the crank shaft of internal combustion engines be extended as at S' to permit the flow of lubricant rearwardly therefrom into a complementarily disposed axial passageway P in the driving shaft 10. The forward end of the driving shaft may extend into an appropriate opening in the end of the crank shaft or associated parts in a manner substantially to prevent leakage at the point of connection, but such leakage as may occur is intended to be caught in the annular undercut groove G in the rear face of the fly wheel and discharged therefrom by such means as a suitable passage G'.

Fluid under pressure entering the passage P may be led off through suitable lateral passages $p$ to bearings 13a and 13b, for example, and may also by other appropriate lateral passages be led to the teeth of the sun gears 11 and 12 and to the planet bearings. The passage P in the driving shaft 10 preferably extends to the rearward end thereof terminating in a chamber K, whence lubricant may flow to the adjacent bearing 136 and also rearwardly in the tail shaft of the gear carrier 30, and thence by appropriate passages to the other bearings and attendant mechanism. Appropriate return or vent ports $r$ may be provided in peripheral portions of the drums 2 and 3 and appropriate return passages may be provided in the inner walls of the casing to permit the free return of fluid to the engine sump. These latter passages as such are not shown in Fig. 1 because the section is not a vertical one and the passages should preferably be disposed where the effect of gravity can be best utilized to aid in the return of the oil to the sump.

In Figures 11 to 17 I have illustrated a modified form of my transmission wherein the parts are arranged and function as in the preferred embodiment except as modified by the elimination of the over-drive features, described above.

The transmission generally identified at T' is enclosed by a bell housing 201 and the drums 202, 203, gear carrier 330 and associated parts are mounted substantially as corresponding parts in the preferred form. However, since the over-drive is dispensed with in this form the drive from the torque gear 220 is transmitted directly to a collar 310 splined directly to the driven shaft 300 and a different method is employed to effect reverse drive than as taught by the preferred form. Generally speaking, the reverse drive is effected by reversing the rotation of the gear carrier and as described below means are provided to render the gear carrier ratchet clutch ineffective and to restrain drum rotation.

The forward wall 204 of the main transmission housing has secured thereto by rivets or other suitable means a notched ring 280 (see also Figure 12) which may be constructed as the ring 80 of the preferred embodiment in that it may comprise two complementary halves with a fabric ring therebetween, but distinguishes from the ring of the preferred embodiment in that the notches provided at the inner periphery of the ring are spaced from each other by smooth peripheral portions 280a. An annular ring 275 U-shaped in cross section is splined to the forward end of the gear carrier 230 and supports a series of pawls 276 adapted to engage the ring 280 in the above described manner.

Figure 12:
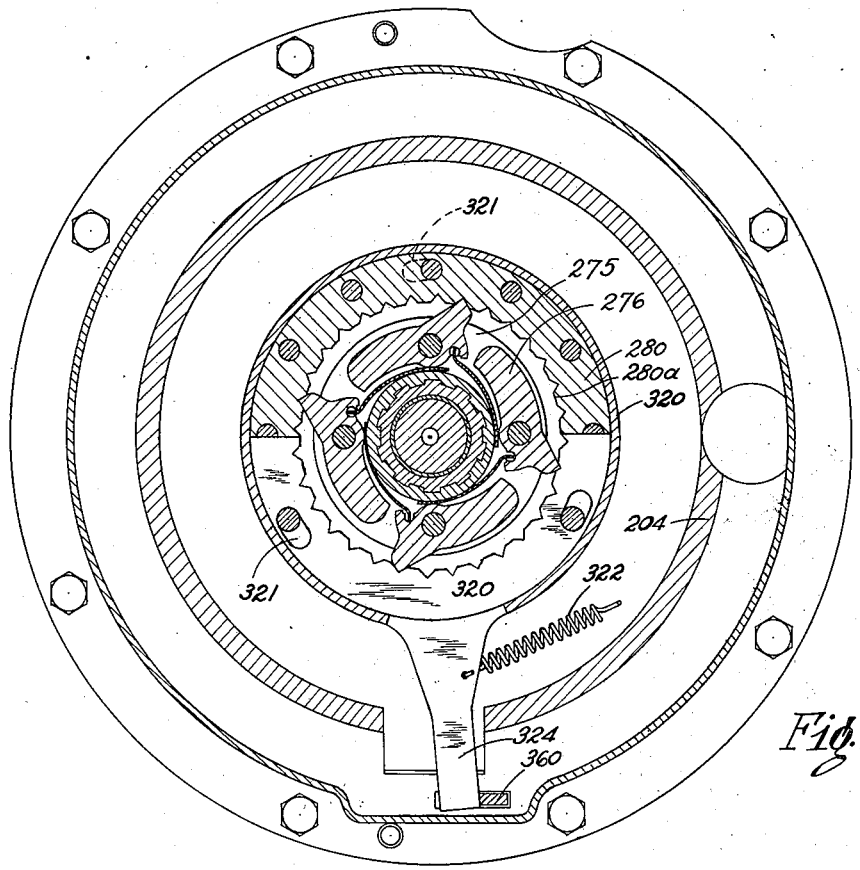
Figure 12 is a transverse section looking forwardly on the line 12—12 of Figure 11 illustrating the overrunning clutch and manual control therefor.
Figure 16:
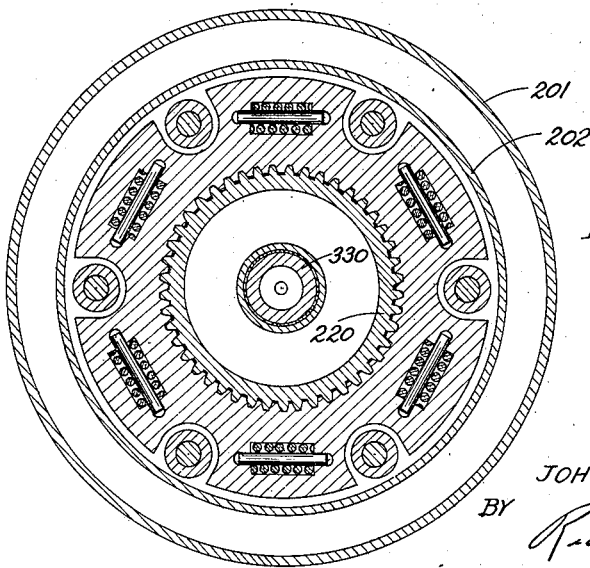
Figure 16 is a transverse sectional view on line 16—16 of Figure 11 illustrating a splined connection between a driven drum torque gear member concentric thereto.
Figure 13:
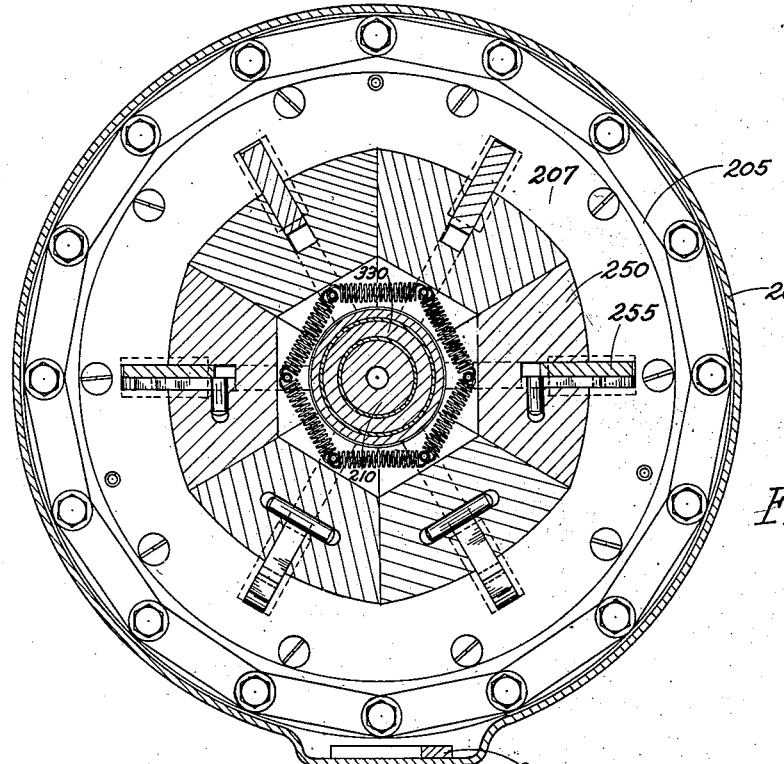
Figure 13 is a transverse sectional view on line 13—13 of Figure 11 illustrating the governor weight assembly in this form of my invention.
Figure 15:
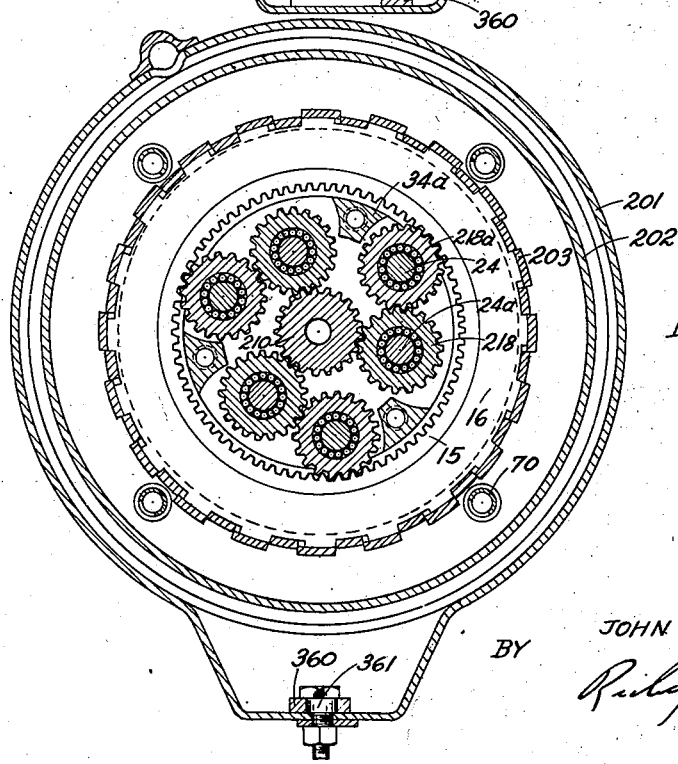
Figure 15 is a transverse sectional view on line 15—15 of Figure 11 illustrating the low speed gear assembly.

A flanged ring 320 is proportioned to surround the notched ring 280 and has on its inner periphery a series of notches coincident in shape and number with the notches formed on the ring 280. The flanged ring 320, however, is mounted with respect to the ring 280 to have a limited rotation with respect thereto as permitted by means of the slots 321 formed in the ring. An arm 324 integrally formed or secured to the ring 320 extends from the lower side thereof as best illustrated in Figure 12 and has mounted thereon one end of a retractor spring 322 which is anchored to the cover plate 204. The retractor spring normally urges the ring 320 to the limit of its rotation in one direction as permitted by slots 321 and in this extreme position the notches of the ring 320 are aligned with the notches of the ring 280. However, it will be observed that when by means hereafter described the arm 324 is moved to rotate the ring to its opposite limit of movement against the tension of spring 322 the smooth inner peripheral portions of the ring 320 will overlap the notches in the ring 280. Since the pawls 276 are sufficiently wide to engage both the fixed ring 280 and the movable ring 320 and since the rotation of ring 320 effectively closes the notches in both rings, the nose portion of the pawls are ineffective to engage the notches in either ring and thereafter rotate freely with respect thereto.

In the normal forward drive through the transmission the low speed clutch-gear starter 235 and the second speed governor weight and cam mechanism 250—255 operate in the manner above described to establish low speed drive, second speed drive and a direct or high speed drive through the torque gear 220 and thence through the collar 310 to the driven member 300. It will be understood by those skilled in the art that when the drums are restrained from rotation and the low speed clutch-gear is compressed, that by reason of the planetary arrangement of the gears 218—218a that the gear carrier as a unit will be rotated in a direction opposite to the rotation of the driving shaft 210 provided it is freed to do so by control of the overrunning clutch above described. In the modified form of my invention I preferably restrain the rotation of the drums to effect reverse rotation of the gear carrier by means of a brake band 318 which has one end thereof secured to the main transmission casing as at 319 (best shown in Figure 14) and the other end secured to a manually operated brake lever. A boss is provided on the exterior of the main casing to pivotally support a shaft 315 which has secured thereto on its inner end an eccentric disk 316 eccentrically positioned with respect to the axis of the shaft 315. On the inner face of the disk 316 is a pivot pin 317 projecting through an aperture of the brake band 318. Rotation imparted to shaft 315 by any suitable means will by reason of the eccentric connection to the brake band 318 cause the same to be tightened or released with respect to the drum 202 which it surrounds.

Pivotally supported by means of an adjustable eccentric bearing 361, see Figure 11, in the inner surface of a flat depression at the lower side of the main casing 201 and arranged adjacent the reverse brake actuating means above described is a forwardly extending lever 360, see also Figures 12 and 14. The forward end of the lever 360 bears against the outer end of the arm 324 carried by the ratchet control ring 320 at the forward end of the transmission and the intermediate portion of the lever 360 bears against the eccentric disk 316 which is actuated simultaneously with the brake band mechanism.

The several parts are so proportioned and arranged that rotation of the shaft 315 through the cam or eccentric 316 rocks the lever 360 to swing the arm 324 and move the notched plate 320 with relation to the notched plate 280 in a manner to disengage the pawls 276 as above described to permit rearward rotation of the gear carrier 330 whilst the same movement of the shaft 315 tightens the reverse brake bank 318 to hold the drums 202 and 203 against rotation. Opposite rotation of the shaft 315 has the opposite effect, i. e., permits the pawls to engage the notches in the rings 320 and 280 to hold the carrier 330 against negative rotation, and at or about the same time releases the brake band 318 to permit the drums 202 and 203 to be driven in their normal direction of rotation for forward drive. Through the adjustment 319 of the brake band and the adjustment of the pivot point of the rearward end of the lever 360 at 361, the timing of the engagement and release of the band 318 with respect to the release or engagement respectively of the pawls 276 from the ratchet of the rings 280 and 320 can be adjustably determined and set for the most advantageous synchronizing of these functions.

To transmit the negative rotation which may be imparted to the gear carrier 330 in the event that the torque drum 202 is restrained and the pawl and ratchet 276—280 is rendered inoperative, the rear end of the gear carrier has splined thereto a gear 231, see Figure 11, having the same pitch diameter as the hub gear 291 of the torque gear 220. When by means of a yoke shifting device the collar 310 normally in engagement with the torque gear at 291 is moved rearwardly the teeth 297 of said collar may be engaged with the gear 321 on the gear carrier and thus the negative rotation of the gear carrier is imparted directly to the driven shaft 300.

The hub gear 291 of the torque gear member 220 is spaced from the gear 231 to provide an intermediate or non-driving position of the collar 310 so that the entire transmission may be disconnected from the driving shaft, i. e., be shifted into neutral.

To actuate the collar 310 to effect the forward, neutral or reverse drive of the transmission I preferably position a yoke member 352 in a collar on the hub portion 298 of the internally splined member 310. A Bowden wire unit or similar device 350 is extended through the upper side of the transmission housing 201 and the wire thereof connected to the upper end of the yoke 352 as at 351. The Bowden wire may be arranged to extend upwardly into the vehicle operator's compartment and may be manually actuated therefrom in any convenient manner.

As suggested above, the Bowden control 350 may lead to the operator's compartment and may preferably be actuated through a hand lever bearing suitable indicia to give visible indication of the position selected for the yoke 352 and shifting collar 310. In such an embodiment I prefer that actuation of the reverse band and overrunning clutch through the shaft 315 and the lever 315a attached thereto be effected through a foot pedal, whereby the reverse drive may be subject to pedal pressure determined by the operator. I contemplate, however, as shown in Figure 18 that the control of the shifting yoke 352 may be mechanically or otherwise connected to respond to rotation of the shaft 315 so that the whole of the reverse operation may be accomplished through the actuation of but one pedal or lever, preferably the former, under the driver's control.

In the alternative means for effecting a reverse drive in the modified form of my transmission illustrated in Figures 18 and 19 the shifting movement of the collar 310 is effected through the lever 562 by the rotation of the shaft 515, which actuates the brake band 318 and overrunning clutch bar 324. The actuating shaft 515 in addition to carrying the offset pin 517 to move the brake band is provided with an offset cam face 573 positioned to abut a complementary cooperating cam face 572 integral with the lever 560. A pin 574 projects upwardly from the face 572 to provide a pivotal connection for the link 550 which is connected through springs 575—576 to the end of the lever 562 pivoted to the transmission housing. Upon rotation of the actuating shaft 515 the face 573 integral therewith urges the lever 560 against the action of spring 322 carried by bar 324 about pivot 561 through the abutment with face 572 thereon. This movement urges the bar 324 into a position rendering the overrunning clutch 280 ineffective and moves the collar 310 to a reverse drive position. It will be noted that in this form of control the actuating bar 560 projects through an aperture in bar 324 and thus the ratchet ring is positively moved with link 550. The brake band engaged by pin 517 may be adjusted or proportioned to be tightened about the drum at about the time that bar 560 has closed the ratchet ring to the reception of the pawls and reverse drive is effected in a manner described in connection with the description of the form shown in Figure 11.

The springs 575—576—322, it will be observed, effect a resilient impositive movement of the collar 310, which facilitates the movement of the teeth 297 into and out of engagement with the gears 231 and 291. This impositive movement of the collar 310 permits the collar teeth 297 to "feel" their way into and out of engagement, and prevents the application of excessive longitudinal engaging pressures in the event that the teeth on gear 297 and gear 291 or 231 should be directly in line when the shaft 515 is actuated. Another feature of this control is the positive movement of the ratchet ring simultaneous with a shift from reverse to direct drive. This will insure an opening of the notches and engagement of the pawls 276 coincident with a shifting of the collar 310 and thus remove the danger of any rapid gear carrier rotation prior to the opening of the notches in the ratchet ring. In other words the pawls and ratchet ring are positioned to restrain the gear carrier before any forces are applied to rotate the gear carrier. A further advantage of this construction is that the engagement through faces 572 and 573 permits a release of the brake band 318 and consequent cessation of the reverse rotation in the gear carrier prior to the movement of bar 560, and forward movement of the collar 310 in response to the urging of springs 322 and 575.

In establishing a reverse rotation of the driven shaft, the low speed clutch gear starter 235 functions as described in the establishment of low speed except that since the drum is stationary the function of the starter is to compress the disks of the clutch gear and thus tend to restrain the rotation of the toothed disks in engagement with the planetary gear. During reverse drive in this form of my invention the drums 202 and 203 being held stationary by means of the brake band, the centrifugal governor remains idle and no forces therefrom come into operation to disengage the low clutch gear or change the gear ratios in reverse.

In reverse drive the pressure on the disks of the low speed clutch-gear is proportional to the torque transmitted as in normal forward low speed drive and the reaction of this torque on the clutch gear is transmitted through the drums to the brake band. A release of the brake band will permit the drums to rotate freely in response to the driving effort of the planetary gears 218—218a and thus discontinue the application of the torque to the gear carrier.

The brake band has in its co-action with the drum another utility; that is, when the collar 310 is transmitting torque from the member 220 to the driven shaft, as it does for all the forward speeds, tightening of the brake band through the lever and eccentric mounting as at 317—315 will serve as a brake to retard the forward motion of the vehicle.

To summarize the general operation of the modified form of my invention illustrated in Figures 11 to 19 reference is made to the operation of the preferred embodiment especially in the three forward speeds obtained without the overdrive. The pawl and ratchet assembly 276—280 of the modified form is ineffective to change the operation in the three forward speeds and the shifting collar 310 transmits the same rotational speed of the torque gear as the ring gear 110 of the preferred embodiment in the absence of over-drive.

In the modified form of my invention it will be noted that the gear 231 at the rear end of the gear carrier which is normally employed in reverse drive rotates at the same speed as the torque gear 220 during direct drive. By shifting the collar 310 to engage the gear 231 during direct drive the ability of the transmission to respond to torque changes through torque gear 220 is removed and the transmission remains in "high" or direct drive. Throughout this form of direct drive the transmission is non-responsive to torque variations and remains in high until the rotational speed decreases to render the governor weights 250 ineffective to maintain clutch-gear engagement.

While the foregoing description and specification has illustrated and described a present preferred form of an embodiment of my invention and a modified construction, it is to be understood that I do not hereby propose to limit myself to the specific form or details of construction herein illustrated and described or in any manner other than by the claims appended hereto when construed with the reasonable range of equivalents to which they may be entitled in this art.

I claim:

1. In a motor vehicle having an engine with an intake manifold and a transmission having driving and driven shafts, two change-speed mechanisms arranged between said shafts, one of said mechanisms being responsive to speed and torque to effect changes in speed ratio between said shafts, the other mechanism being responsive to changes in intake manifold pressure to effect increases and decreases in speed ratio between the first mechanism and one of said shafts, said second named mechanism increasing said speed ratios automatically when manifold pressure exceeds a predetermined amount and decreasing said speed ratios automatically when manifold pressure falls below a predetermined amount.

2. In a motor vehicle having an internal combustion engine having an intake manifold, a change speed transmission, friction brake means for changing the speed ratio of said transmission, fluid pressure actuated means for operating said brake means, a fluid connection between said intake manifold and said fluid-pressure actuated means, and valve means in said connection for permitting transmission of manifold pressure to said fluid pressure actuated means only when the difference between manifold pressure and atmospheric pressure is sufficient to operate said fluid pressure actuated means without causing undesirable slippage of said brake means.

3. In combination in a motor vehicle, an internal combustion engine having an intake manifold, a propeller shaft, a change gear mechanism for changing the driving ratio between said engine and said propeller shaft, fluid pressure controlled means for operating said change gear mechanism, a fluid connection between said pressure controlled means and said intake valve means in said fluid connections responsive to manifold pressure for controlling said first named means, manually controllable valve means including a check valve in said connection adapted, in one position of adjustment, to transmit manifold pressure to said fluid pressure controlled means when said manifold pressure varies from atmospheric pressure at least by a predetermined amount to cause said change speed mechanism to be operated automatically in accordance with changes in manifold pressure, in another position of adjustment to render said fluid pressure controlled means inoperative whereby the change gear mechanism is retained in one speed ratio, and in a third position of adjustment to transmit manifold pressure to said fluid pressure controlled means to retain said change gear mechanism in different speed ratio.

4. In a motor vehicle having driving and driven shafts and change speed mechanism operatively associated with said shafts, an over-drive operable independently of said change speed mechanism for varying the speed ratios between said shafts comprising a ring gear operatively connected to one of said shafts, a sun gear and planet gears associated with said ring gear, a carrier for said planets, means restraining the sun gear from exceeding the speed of the other of said shafts, means for selectively restraining said sun gear from rotation, means for selectively restraining said carrier from rotation, and means for selectively driving said carrier from said last named shaft to establish direct and over-drive relationship between said shafts on the one hand, and for selectively driving said planets while holding said carrier to establish a reverse drive relationship between said shafts on the other hand.

5. In an over-drive mechanism having a housing and a driving shaft and a driven shaft arranged therein, a gear carrier splined to rotate with said driving shaft and having a series of planet gears thereon, a ring gear surrounding said planet gears having an offset reduced hub portion splined to rotate with said driven shaft, a sun gear rotatably surrounding said driving shaft in geared engagement with said planet gears, means to frictionally restrain rotation of said sun gear comprising a series of spaced projections carried by said housing, a cam ring arranged within said housing and having cam surfaces thereon arranged adjacent said projections, means to rotate said cam ring with respect to said projections to effect an axial movement of said cam ring, and a friction disc supported between said cam ring and a wall of said housing and splined to said sun gear and adapted to be restrained by the axial movement of said cam ring.

6. In a transmission having driving and driven shafts, a gear carrier surrounding said driving shaft having two sets of planet gears supported thereon, sun gears on said driving shaft, one set of said planet gears in mesh with one sun gear on said driving shaft and the other set of planetary gears axially spaced with respect to the first set and in mesh with another second sun gear on said driving shaft, a pair of clutch gears axially spaced and separately surrounding and engaging each of said sets of planetary gears and selectively engageable with said driven shaft.

7. The combination according to claim 6 with means for maintaining clutch gear engaging pressures in at least one of said clutch gears proportionate to the torque transmitted therethrough.

8. In a transmission the combination of a plurality of planet gears rotatably mounted on axes fixed relative to each other, a planet carrier part supporting said axes and a ring gear part encompassing and engaging said planet gears, one of said parts being rotatably mounted and supported on a relatively fixed support and the other of said parts being rotatable and having substantially no external support other than the geared engagement between said planets and said ring gear whereby the axes of said parts may shift relative to each other to facilitate the equal distribution of the tooth loads between said planet gears and said ring gears.

9. In a transmission the combination of a plurality of gears circumferentially spaced from each other and mounted on axes fixed relative to each other, and a clutch gear comprising toothed disks movable with respect to each other and in geared engagement with said first named gears and disks interposed therebetween and frictionally engageable therewith for transmitting movement therefrom or thereto, said toothed disks being freely movable at least transversely of the axes of said first named gears in response to tooth pressures developed therebetween.

10. In a transmission the combination of three planet gears mounted on axes fixed with respect to each other defining a circle in a plane transverse thereto, and a clutch gear comprising frictionally engageable driving and driven parts lying parallel to said plane, certain of said parts having gear teeth engaging said planets and being unsupported in the direction of said plane other than by said geared engagement.

11. The combination according to claim 10 in which the three planet gears therein described are spaced equidistantly from each other.

12. In a transmission the combination of a sun gear, a plurality of primary planet gears in engagement therewith, a plurality of secondary planet gears in engagement with said primary planet gears, all of said planet gears mounted on axes fixed relative to each other, and a ring gear comprising a plurality of rotatable parts movable relative to each other in geared engagement with said secondary planet gears and unsupported at least in the direction transverse to the axes of said planet gears other than by their geared engagement therewith.

13. In a transmission, the combination of a geared driving member, a splined driven member, a clutch gear having parts respectively in splined and geared engagement with said members and having a limited freedom of movement in said splined engagement, means coacting with said splined member and said parts to engage said members for the geared member to drive the splined member and to permit the splined member to be disengaged from the geared member through at least an initial overrunning thereof in the freedom of movement in the said splines.

14. In a transmission having driving and driven shafts, reduction gearing disposed between said shafts engageable to establish a geared relationship therebetween, said reduction gearing comprising a clutch gear having driving disks geared to the driving shaft and driven disks splined to rotate with the driven shaft, and means to effect a frictional engagement between said driving and driven disks comprising a member having a pawl and ratchet engagement with one of said driving disks and cam means engageable with said splined disks whereby rotation of said driving shaft moves the cam means to effect a frictional engagement of said disks.

15. In a transmission having driving and driven shafts and gearing disposed therebetween comprising a gear carrier rotatably mounted concentric with said shafts, means for selectively preventing or permitting reverse rotation of said gear carrier while permitting free forward rotation comprising a ring fixed with respect to said carrier having spaced ratchet notches at its inner periphery arranged to surround a portion of said gear carrier, pivoted pawls on said gear carrier portion positioned to engage said notches, a second ring concentric with said fixed ring provided with similarly spaced notches, said second ring mounted for slight rotational movement with respect to the fixed ring whereby it may be moved so that the spaces between the notches on said second ring overlap and effectively close the notches of the fixed ring and the like spaces on the fixed ring similarly close the notches of the second ring.

16. In a transmission having driving and driven shafts and epicyclic gearing having movable and restrainable parts disposed therebetween, releasable one way brake means for restraining one of said parts while forward rotation is transmitted between said shafts, friction means for restraining another of said parts to cause reverse rotation of said first part, means for selectively connecting said driven shaft with one or the other of said parts, means for actuating said brake means directly connected to said last named means, and means for actuating said friction means having engaging contact with said brake actuating means to move the same in one direction only.

17. Apparatus for controlling the over-all speed ratio between a driving element and a driven element which includes means for automatically selectively establishing primary speed ratios between said elements, and means for automatically modifying the over-all ratio therebetween in response to either positive or negative variations in effort sought to be transmitted without thereby necessarily changing from one primary ratio to another.

18. Apparatus for controlling the over-all speed ratio between a motor vehicle engine and the driven wheels of the vehicle which includes means for automatically selectively establishing primary speed ratios between the engine and the driven wheels, and means for automatically modifying any selectively established primary speed ratio in response to variations in effort demanded of the engine.

19. In combination in a motor vehicle, an internal combustion engine having an intake manifold, an over-drive transmission for said vehicle, means for maintaining the over-drive in engagement to reduce the ratio between engine speed and car speed, said last named means being responsive to intake manifold pressure whereby said ratio will be reduced only when intake manifold pressure differs from atmospheric pressure by at least a predetermined amount and said over-drive will be disengaged whenever the intake manifold pressure differs from atmospheric pressure by less than said predetermined amount.

20. Apparatus for controlling an over-drive transmission of a motor vehicle having an internal combustion engine which comprises means responsive to the effort sought to be transmitted for maintaining said over-drive in engagement to reduce the ratio between engine speed and car speed when the effort sought to be transmitted by the engine is less than a predetermined amount and means for disengaging the over-drive whenever the effort sought to be transmitted by the engine exceeds said predetermined amount.

JOHN SNEED.